US011392598B2

(12) United States Patent
Hewavitharana et al.

(10) Patent No.: US 11,392,598 B2
(45) Date of Patent: Jul. 19, 2022

(54) APPLYING A QUANTITATIVE RANGE FOR QUALITATIVE TERMS

(71) Applicant: eBay Inc., San Jose, CA (US)

(72) Inventors: Sanjika Hewavitharana, Milpitas, CA (US); Ajinkya Gorakhnath Kale, San Jose, CA (US)

(73) Assignee: eBay Inc., San Jose, CA (US)

(*) Notice: Subject to any disclaimer, the term of this patent is extended or adjusted under 35 U.S.C. 154(b) by 60 days.

(21) Appl. No.: 15/297,902

(22) Filed: Oct. 19, 2016

(65) Prior Publication Data
US 2018/0107917 A1 Apr. 19, 2018

(51) Int. Cl.
G06F 16/2458 (2019.01)
G06F 16/23 (2019.01)
G06F 16/901 (2019.01)
G06N 5/02 (2006.01)
G06Q 30/06 (2012.01)
G06N 20/00 (2019.01)

(52) U.S. Cl.
CPC .......... *G06F 16/2468* (2019.01); *G06F 16/23* (2019.01); *G06F 16/9024* (2019.01); *G06N 5/022* (2013.01); *G06Q 30/0631* (2013.01); *G06N 20/00* (2019.01)

(58) Field of Classification Search
None
See application file for complete search history.

(56) References Cited

U.S. PATENT DOCUMENTS

| 2010/0262532 | A1* | 10/2010 | Chitaley | G06Q 30/0283 |
| | | | | 705/37 |
| 2012/0226698 | A1* | 9/2012 | Silvestre | G06Q 30/02 |
| | | | | 707/741 |
| 2013/0111348 | A1* | 5/2013 | Gruber | G06F 17/3087 |
| | | | | 715/727 |
| 2014/0181136 | A1* | 6/2014 | Johnson | G06F 17/30864 |
| | | | | 707/768 |
| 2015/0142711 | A1* | 5/2015 | Pinckney | G06Q 30/02 |
| | | | | 706/12 |
| 2016/0034563 | A1* | 2/2016 | Cormier | G06F 16/9535 |
| | | | | 707/742 |
| 2016/0162574 | A1* | 6/2016 | Gorodilov | G06F 16/338 |
| | | | | 707/722 |
| 2016/0284001 | A1* | 9/2016 | Pathak | G06Q 30/0627 |
| 2017/0061462 | A1* | 3/2017 | Bhalgat | H04L 51/32 |
| 2017/0357637 | A1* | 12/2017 | Nell | H04L 12/2823 |

* cited by examiner

*Primary Examiner* — Kris E Mackes
*Assistant Examiner* — Soheila (Gina) Davanlou
(74) *Attorney, Agent, or Firm* — Shook, Hardy & Bacon L.L.P.

(57) ABSTRACT

In various example embodiments, a system and method for applying a quantitative range for qualitative terms. In one example, a method includes gathering user interactions, identifying a qualitative term included in the user interactions, building an electronic knowledge graph that associates the qualitative term with a quantitative range for the product identified using the qualitative term according to values in the user interactions that include the qualitative term, receiving a query for the product that includes the qualitative term, and performing, in response to receiving the query, a search that limits results according to the quantitative range stored in the knowledge graph.

19 Claims, 13 Drawing Sheets

APPLYING A QUANTITATIVE RANGE FOR QUALITATIVE TERMS

FIELD

The present disclosure generally relates to machines configured to the technical field of special-purpose machines that facilitate determining quantitative ranges including computerized variants of such special-purpose machines and improvements to such variants, and to the technologies by which such special-purpose machines become improved compared to other special-purpose machines that determine a quantitative range from qualitative terms.

BACKGROUND

Traditional searching is impersonal. One cannot speak to a traditional browsing engine in normal language using qualitative terms because the qualitative terms may imply different aspects for different products. Conventional searching is time consuming, there is too much selection and much time can be wasted browsing pages of results. Trapped by the technical limitations of language and conventional tools, it is difficult for a user to communicate intent. As selection balloons to billions of items online, comparison searching has become more critical than ever, while current solutions were not designed for this scale. Irrelevant results are often shown and do not bring out the best results. Traditional forms of comparison searching (search+refinements+browse) are no longer useful.

BRIEF DESCRIPTION OF THE SEVERAL VIEWS OF THE DRAWINGS

In order more easily to identify the discussion of any particular element or act, the most significant digit or digits in a reference number refer to the figure number in which that element is first introduced.

DETAILED DESCRIPTION

The description that follows describes systems, methods, techniques, instruction sequences, and computing machine program products that illustrate example embodiments of the present subject matter. In the following description, for the purposes of explanation, numerous specific details are set forth in order to provide an understanding of various example embodiments of the present subject matter. It will be evident, however, to those skilled in the art, that example embodiments of the subject matter may be practiced without these specific details.

In one example embodiment, an intelligent personal assistant system includes scalable artificial intelligence (AI) that permeates the fabric of existing messaging platforms to provide an intelligent online personal assistant (or "bot"). The system leverages existing inventories and curated databases to provide intelligent, personalized answers in predictive turns of communication between a human user and an intelligent online personal assistant. One example of an intelligent personal assistant system includes a knowledge graph. Machine learning components continuously identify and learn from user intents (e.g., use of qualitative terms) so that user identity and understanding is enhanced over time.

In other examples, the intelligent personal assistant system considers use of qualitative terms to build the knowledge graph. In certain scenarios, as many users provide certain qualitative terms for a specific product and subsequently interact with the intelligent personal assistant system based on the product, the knowledge graph is constructed to include an association between the qualitative terms and quantitative ranges for the product with which the user interacted. In one example embodiment, the association is based on a statistical analysis of the user interactions that include the qualitative term and the product.

Subsequently, in response to a user searching for a product using a qualitative term, the intelligent personal assistant system may restrict search results to those that fall within a numerical range associated with the qualitative terms for the product based, at least in part, on learned ranges from other users interacting with the intelligent personal assistant system. Therefore, such a system is capable of understanding and quantitatively applying qualitative terms received from a user.

Figure 1:
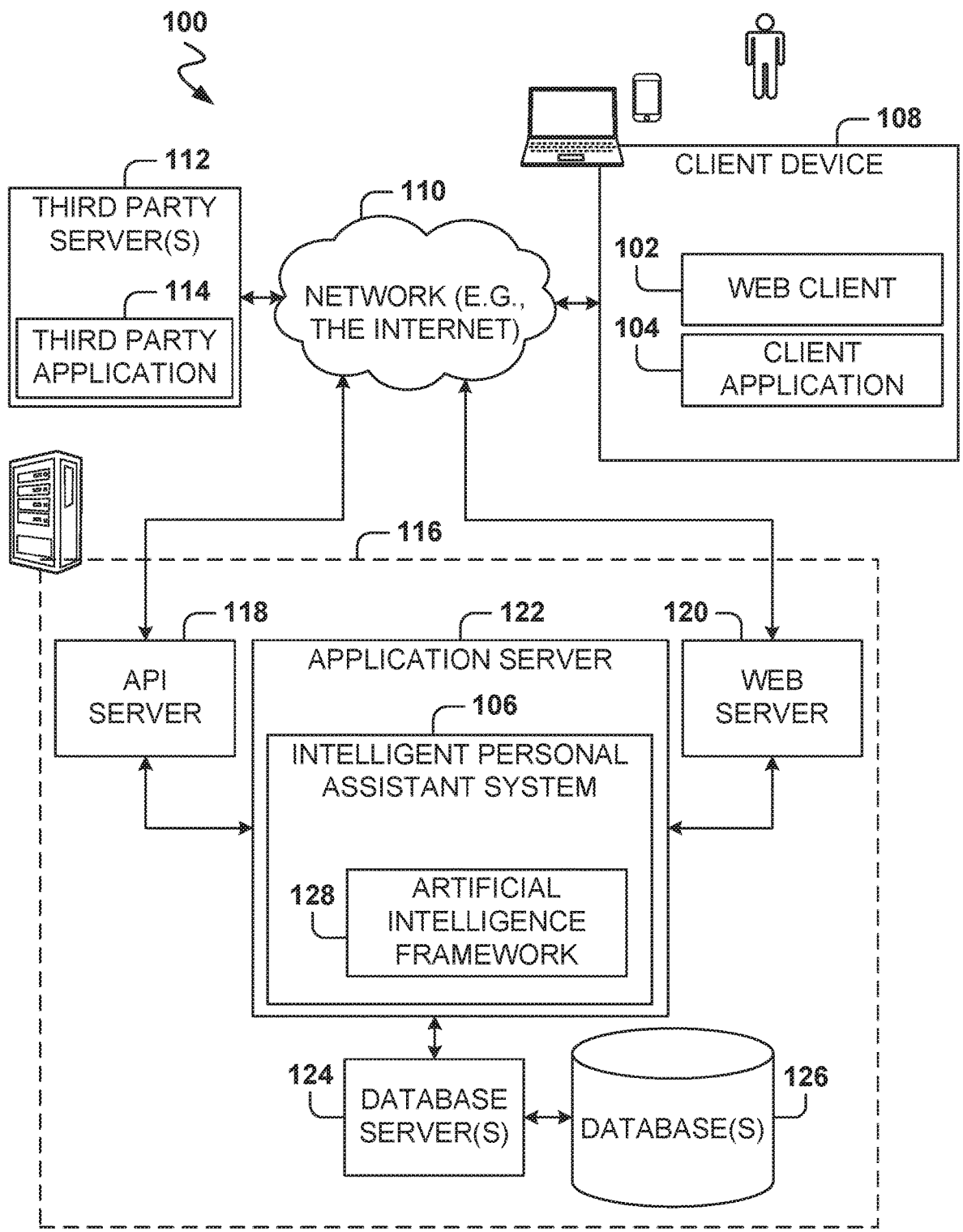
FIG. 1 is a block diagram illustrating a networked system, according to some example embodiments.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of a client application 104, are hosted and execute on the client device 108. The networked system 116 includes an application server 122, which in turn hosts an intelligent personal assistant system 106 that provides a number of functions and services to the client application 104 that accesses the networked system 116. In one example embodiment, the intelligent personal assistant system 106 provides a natural interface for users and allows the users to interface with a networked marketplace using imagery, voice, text, or other inputs. The client application 104 also provides a number of interfaces described herein, which present output of tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user. In certain embodiments, the input includes any one or more of audio, textual, pictorial, or the like.

An Application Program Interface (API) server 118 and a web server 120 are coupled to, and provide programmatic and web interfaces, respectively, to the application server 122. The application server 122 hosts the intelligent personal assistant system 106, which includes components or applications. The application server 122 is, in turn, shown to be coupled to a database server 124 that facilitates access to information storage repositories (e.g., a database/cloud 126). In an example embodiment, the database/cloud 126 includes storage devices that store information accessed and generated by the intelligent personal assistant system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., the intelligent personal assistant system 106) via the web interface supported by the web server 120. Similarly, the client application 104 (e.g., an "app") accesses the various services and functions provided by the intelligent personal assistant system 106 via the programmatic interface provided by the Application Program Interface (API) server 118. The client application 104 may, for example, be an "app" executing on a client device 108, such as an iOS or Android OS application to enable the user to access and input data on the networked system 116 in an off-line manner, and to perform batch-mode communications between the programmatic client application 104 and the networked system networked system 116. In one example, the user of the client device 108 verbally expresses desire to search for an item and submits an image of the item using the application 104. In turn, the client application 104 transmits the audio representation of the user's verbal expressions combined with the image of the item to the API server 118.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The intelligent personal assistant system 106 could also be implemented as a standalone software program, which does not necessarily have networking capabilities. In another example embodiment, the intelligent personal assistant system 106 includes an artificial intelligence framework 128 as will be further described.

Figure 2:
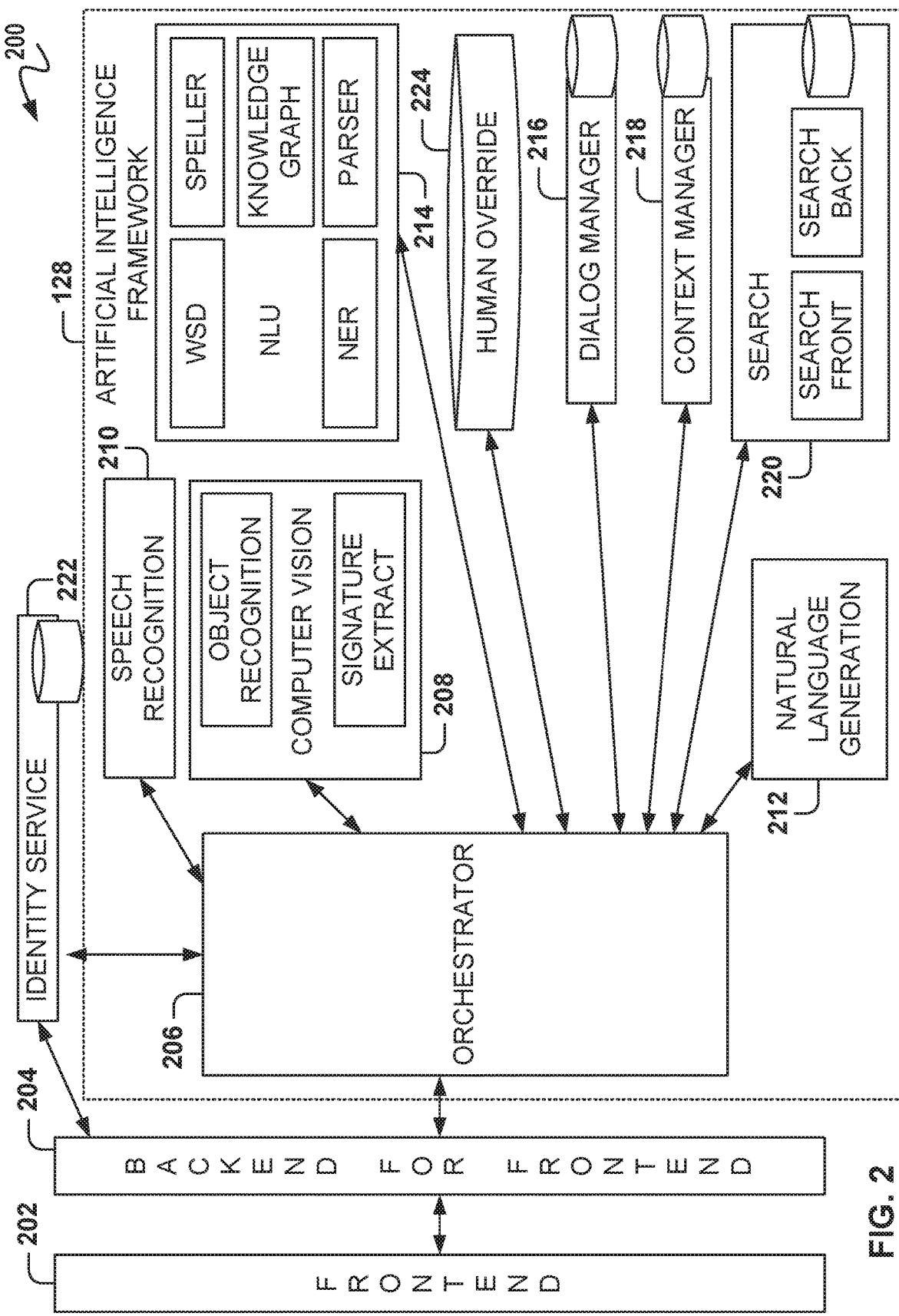
FIG. 2 is a block diagram showing architectural details of an intelligent personal assistant system, according to some example embodiments.

FIG. 2 is a block diagram showing the components of the intelligent personal assistant system 106, according to some example embodiments.

Specifically, the intelligent personal assistant system 106 is shown to include a front end component 202 (FE) by which the intelligent personal assistant system 106 communicates (e.g., over the network 110) with other systems within the SaaS network architecture 100. The front end component 202 can communicate with the fabric of existing messaging systems. As used herein, the term "messaging fabric" refers to a collection of APIs and services that can power third party platforms such as Facebook messenger, Microsoft Cortana and other "bots." In one example embodiment, a messaging fabric can support an online commerce ecosystem that allows users to interact with commercial intent. Output of the front end component 202 can be rendered in a display of a client device, such as the client device 108 as part of an interface with an intelligent personal assistant or "bot."

The front end component 202 of the intelligent personal assistant system 106 is coupled to a back end component 204 for the front end that operates to link the front end component 202 with the artificial intelligence framework 128. The artificial intelligence framework 128 includes several components discussed below.

In one example of the intelligent personal assistant system 106, an AI orchestrator 206 orchestrates communication of components inside and outside the artificial intelligence framework 128. Input modalities for the AI orchestrator 206 are derived from a computer vision component 208, a speech recognition component 210, and a text normalization component which may form part of the speech recognition component 210. The computer vision component 208 identifies objects and attributes from visual input (e.g., photo). The speech recognition component 210 converts audio signals (e.g., spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 128 further includes a natural language understanding or NLU component 214 that operates to parse and extract user intent and intent parameters (e.g., mandatory or optional parameters). The NLU component 214 is shown to include sub-components such as a spelling corrector (speller), a parser, a Named Entity Recognition (NER) sub-component, a knowledge graph, and a Word Sense Detector (WSD). In other example embodiments the NLU component 214 extracts qualitative terms from the user's utterance.

As described herein, a qualitative term includes an adjective that describes some quality of a product available at the electronic marketplace. Non-limiting examples of qualitative terms in the English language include cheap, expensive, nice, classy, ghetto, bad, new, old, good, inexpensive, low-cost, economical, bargain, cut-rate, fancy, extravagant, lavish, upscale, unique, priceless, invaluable, ritzy, chic, sophisticated, elegant, posh, dashing, sick, wicked, sharp, wild, swanky, or other terms. Such qualitative terms do not inherently indicate any specific numerical values or ranges.

Furthermore, a wide variety of qualitative terms are found in many different languages. In other example embodiments, a qualitative term is not a recognized term in a specific language, but is used by users in an unofficial manner. One such example is users who use the term "sick" to indicate an ornate version of a product. Of course, a literal interpretation of "sick" is difficult to apply to a product at the electronic marketplace, however, the artificial intelligence framework 128 with the NLU component will eventually learn quantitative ranges for products where a certain number of users use "sick" to describe the product, or the particular version or state of the product.

In one example embodiment, the NLU component of the artificial intelligence framework determines that a term is an adjective that describes a product. The NLU component may not recognize the explicit meaning of the term, but may still identify the term as a qualitative term describing the product as previously described.

The artificial intelligence framework 128 further includes a dialog manager 216 that operates to understand a "completeness of specificity" (for example of an input, such as a search query or utterance) and decide on a next action type and a parameter (e.g., "search" or "request further information from user"). In one example embodiment, the dialog manager 216 operates in association with a context manager 218 and an NLG component 212 (or Natural Language Generation component). The context manager 218 manages the context and communication of a user with respect to online personal assistant (or "bot") and the assistant's associated artificial intelligence. The context manager 218 comprises two parts: long term history and short term memory. Data entries into one or both of these parts can include the relevant intent and all parameters and all related results of a given input, bot interaction, or turn of communication, for example. The NLG component 212 operates to compose a natural language utterance out of an AI message to present to a user interacting with the intelligent bot.

A search component 220 is also included within the artificial intelligence framework 128. As shown, the search component 220 has front and back end units. The back end unit operates to manage item and product inventory and provide functions of searching against the inventory, optimizing towards a specific tuple of intent and intent parameters. An identity service 222 component, that may or may not form part of the artificial intelligence framework 128, operates to manage user profiles including, for example explicit information in the form of user attributes, e.g. "name," "age," "gender," "geolocation," but also implicit information in forms such as "information distillates" such as "user interest," or "similar persona," and so forth. In another example embodiment, the identity service 222 component requests user profile information from a remote server using the third part platform.

In one example embodiment, the intelligent personal assistant system 106 interacts with thousands or millions of users and gathers the user interactions that include a specific product available at the electronic marketplace.

In one example embodiment, the user interactions include selecting the product (e.g., selecting a web page that displays the product), viewing the product (e.g., selecting an interface that displays additional information about the product), purchasing the product, or other interactions that suggests an increased interest in the product. As certain user interactions are based on use of a qualitative term, the intelligent personal assistant system 106 stores the qualitative term and the user interaction. Over time, as many users interact with the electronic marketplace, the intelligent personal assistant system 106 stores many records of such interactions and included qualitative terms.

In one example embodiment, users search for "cheap shoes," and subsequently interacts (e.g., selects, views, purchases, or the like) with shoes available below $40 more frequently than with shoes that cost much more. Over time, as many records and data points are stored, the intelligent personal assistant system 106 learns that "cheap" shoes means shoes that cost less than $40 because, in one hypothetical scenario, 90% of user interactions responding to "cheap shoes" were with shoes that cost less than $40. In this way, the quantitative range is a price range and the intelligent personal assistant system 106 determines a quantitative range for products described using a qualitative term. Subsequently when the intelligent personal assistant system 106 receives a query for "cheap shoes," the intelligent personal assistant system 106 limits search results to those results that are priced below $40.

In another example embodiment, the intelligent personal assistant system 106 retrains a machine learning system at a regular interval. In certain examples, the regular intervals are hours, days, weeks, months, years, or the like. Of course, other regular time periods may be used and this disclosure is not limited in this regard. In this way, the determined quantitative range is based on a recent period of time. Therefore, as market prices change over time, the intelligent personal assistant system 106 accounts for these changes.

In one example embodiment, the intelligent personal assistant system 106 stores user interactions over a recent threshold number of user interactions. In one example, the intelligent personal assistant system 106 trains on the most recent 100,000 user interactions. Of course, other values may be used and this disclosure is not limited in this regard. In this way, the intelligent personal assistant system 106 stores user interactions and determines quantitative ranges based on more recent data and more accurately reflects current market prices.

In another example embodiment, the intelligent personal assistant system 106 limits user interactions to those from a specific user, region, country, or other geographic or cultural boundary. For example, the intelligent personal assistant system 106 may store user interactions to those located in the southern most states of the United States. In this way, the intelligent personal assistant system 106 better learns user intent by not mixing user interactions from different cultural areas. Because users in different cultural areas may use qualitative terms in slightly different ways, by limiting user interactions to specific cultural areas, the intelligent personal assistant system 106 better accounts for these differences.

In one example embodiment, the intelligent personal assistant system 106 verifies with the user of the electronic marketplace whether or not to accept the quantitative range. In one example, the intelligent personal assistant system 106 affects a user interface to pose the question to the user. In response to the affirmative, the intelligent personal assistant system 106 limits the search results to the quantitative range, and in response to the negative, the intelligent personal assistant system 106 does not apply the quantitative range.

In another example embodiment, the intelligent personal assistant system 106 identifies many qualitative terms in the user interactions involving the product and determines respective quantitative ranges for each of the qualitative terms.

In one example, where the determined quantitative ranges overlap, the intelligent personal assistant system 106 shrinks the quantitative ranges so that they do not overlap. For example, where the determined price range for an "exotic watch" is between $2,500 and $4,000 and the determined price range for a "luxury watch" is between $3,000 and $8,000, the intelligent personal assistant system 106 adjusts the determined price ranges to $2,500 to $3,500 for the "exotic watch," and $3,500 to $8,000 for the "luxury watch." In one example, the intelligent personal assistant system 106 adjusts each determined price range by selecting a mid-point between the overlapping values and adjusts each price range according to the mid-point.

The functionalities of the artificial intelligence framework 128 can be set into multiple parts, for example decisioning and context parts. In one example embodiment, the decisioning part includes operations by the AI orchestrator 206, the NLU component 214 and its subcomponents, the dialog manager 216, the NLG component 212, the computer vision component 208, and speech recognition component 210. The context part of the AI functionality relates to the parameters (implicit and explicit) around a user and the communicated intent (e.g., towards a given inventory, or otherwise). In order to measure and improve AI quality over time, the artificial intelligence framework 128 is trained using sample queries (e.g. a dev set) and tested on a different set of queries (e.g. an eval set), both sets developed by human curation. Also, the artificial intelligence framework 128 is trained on transaction and interaction flows defined by experienced curation specialists or human override 224. The flows and the logic encoded within the various components of the artificial intelligence framework 128 define what follow-up utterance or presentation (e.g. question, result set) is made by the intelligent assistant based on an identified user intent.

Reference is made further above to example input modalities of the intelligent online personal assistant (or "bot") in an intelligent personal assistant system 106. The intelligent personal assistant system 106 seeks to understand a user's intent (e.g., targeted search, compare, shop/browse) and any mandatory parameters (e.g., product, product category, item) or optional parameters (e.g., explicit information, e.g. aspects of item/product, occasion) as well as implicit information (e.g., geolocation, personal preferences, age and gender) and respond to the user with a well thought out or "intelligent" response. Explicit input modalities can include text, speech, and visual input and can be enriched with implicit knowledge of user (e.g., geolocation, previous browse history, profile indicators). Output modalities can include text (e.g., speech, natural language sentences, or product-relevant information) and images on the screen of a smart device (e.g., client device 108). Input modalities thus refer to the different ways users can communicate with the bot. Input modalities can also include keyboard or mouse navigation, touch-sensitive gestures, and so forth. In one example embodiment, the intelligent personal assistant system 106 verifies a determined quantitative range with the user by audibly asking the user if the determined price range is acceptable and receiving audio representing the response.

In other example embodiments, the explicit input modalities include qualitative terms. Because the intelligent personal assistant system 106 has trained on user's use of certain qualitative terms, the intelligent personal assistant system 106 is capable of enhancing a user's query to focus the query on products the user is most likely interested in based, at least in part, on the user's use of certain qualitative terms. In one example embodiment, the intelligent personal assistant system 106 adds a quantitative range to the user's query such that search results from the query more likely include products within the price range intended by the user as described herein.

In relation to a modality for the computer vision component 208, a photograph can often represent what a user is looking for better than text. The user may not know what an item is called, or it may be hard or even impossible to use text for fine detailed information that only an expert may know (e.g., a complicated pattern in apparel or a certain style in furniture). Moreover, it is inconvenient to type complex text queries on mobile phones, and long text queries typically have poor recall. Thus, with reference to FIG. 2, key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

In one example, the photograph received from the user includes a photograph of Reebok shoes. In this example, the user may utter "I would like to buy an inexpensive pair of shoes like these." In response, the intelligent personal assistant system 142, using the computer vision components 208, determines that the pair of shoes in the photograph are Reebok shoes of a particular model and a particular color. The intelligent personal assistant system 142 also applies a determined quantitative range (e.g., $24-$41) according to the determined price range for shoes using the qualitative term "inexpensive" for shoes. In one example embodiment, the intelligent personal assistant system 106 employs the computer vision component of the artificial intelligence framework 128. The intelligent personal assistant system 106 then retrieves a size of the shoes from the user's profile. The intelligent personal assistant system 142, then generates a structured query for Reebok shoes of the correct size, model, price range, and color.

Figure 3A:
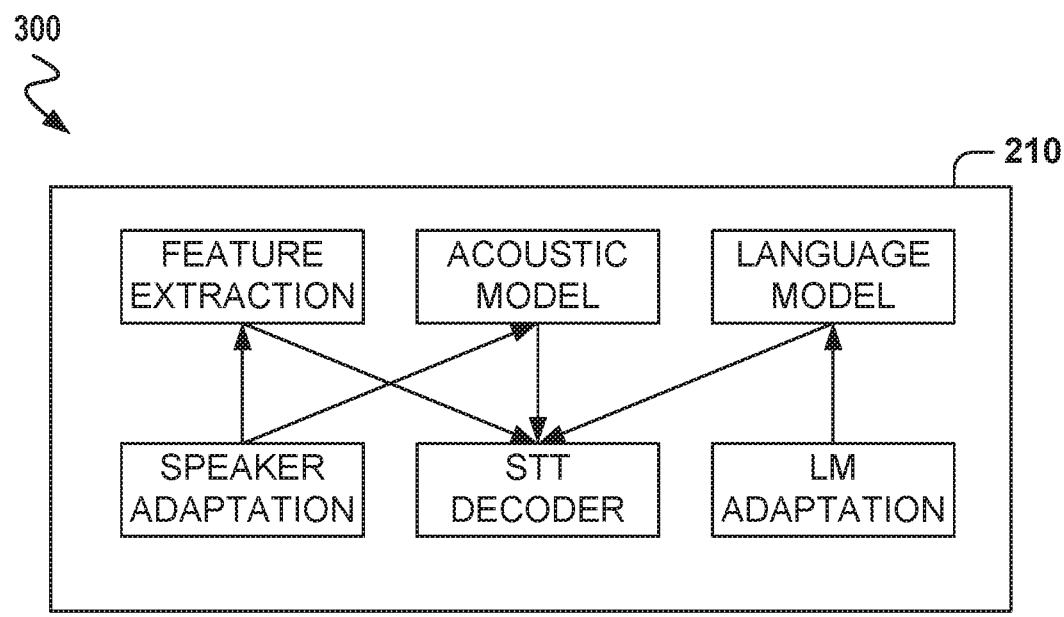
FIG. 3A is a block diagram illustrating components of a speech recognition component, according to one example embodiment.

With reference to FIG. 3A, the illustrated components of the speech recognition component 210 are now described. A feature extraction component operates to convert raw audio waveform to some-dimensional vector of numbers that represents the sound. The feature extraction component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. An STT decoder component converts a speech utterance into a sequence of words typically leveraging features derived from a raw signal using the feature extraction component, the acoustic model component, and the language model component in a Hidden Markov Model (HMM) framework to derive word sequences from feature sequences. In one example embodiment, a speech-to-text service in the cloud (e.g. database/cloud 126) has these components deployed in a cloud framework with an API that allows audio samples to be posted for speech utterances and to retrieve the corresponding word sequence. Control parameters are available to customize or influence the speech-to-text process.

In one example of an artificial intelligence framework 128, two additional parts for the speech recognition component 210 are provided: a speaker adaptation component and an LM adaptation component. The speaker adaptation component allows clients of an STT system (e.g. speech recognition component 210) to customize the feature extraction component or the acoustic model component for each speaker/user. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 128) to be robust to speaker variations by continuously learning the idiosyncrasies of a user's intonation, pronunciation, accent, and other speech factors and apply these to the speech-dependent components (e.g., the feature extraction component and the acoustic model component). While this approach requires a non-significant-sized voice profile to be created and persisted for each speaker, the potential benefits of accuracy generally far outweigh the storage drawbacks.

The LM (Language Model) adaptation component operates to customize the language model component and the speech-to-text vocabulary with new words and representative sentences from a target domain, for example, inventory categories or user personas. This capability allows the artificial intelligence framework 128 to be scalable as new categories and personas are supported.

Figure 3B:
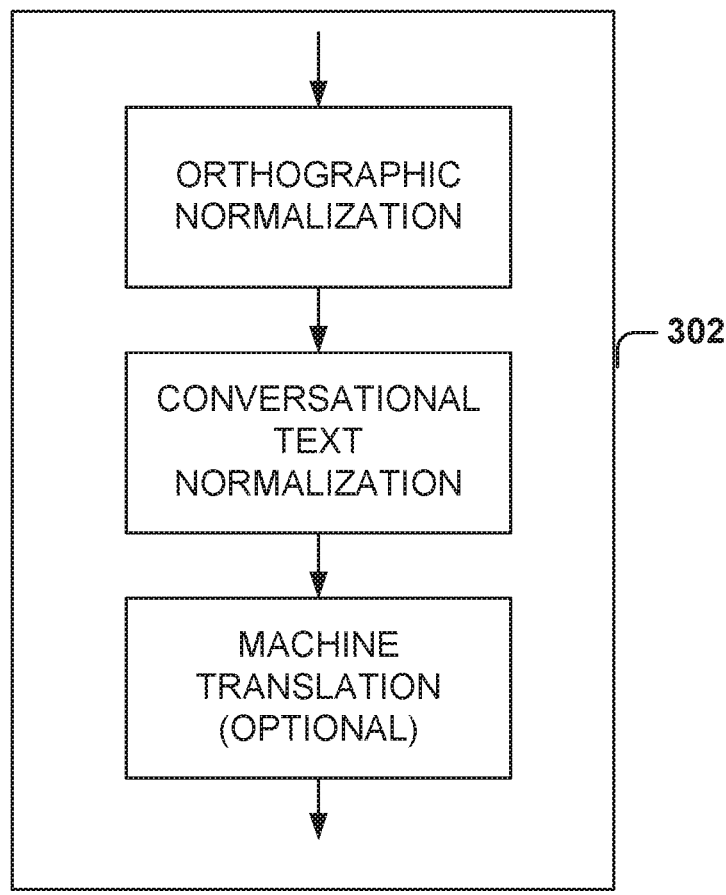
FIG. 3B is a flow sequence for text normalization in an artificial intelligence framework, according to one example embodiment.

FIG. 3B also shows a flow sequence 302 for text normalization in an artificial intelligence framework 128. A text normalization component performing the flow sequence 302 is included in the speech recognition component 210 in one example. Key functionalities in the flow sequence 302 include orthographic normalization (to handle punctuation, numbers, case, and so forth), conversational text normalization (to handle informal chat-type text with acronyms, abbreviations, incomplete fragments, and so forth), and machine translation (to convert normalized sequence of foreign-language words into a sequence of English words, for example).

The artificial intelligence framework 128 facilitates modern communications. Millennials, for example, want to communicate via photos, voice, and text. The technical ability of the artificial intelligence framework 128 to use multiple modalities allows the communication of intent instead of just text. The artificial intelligence framework 128 provides technical solutions and are efficient. It is faster to interact with a smart personal assistant using voice commands or photos than text in many instances.

Figure 4:
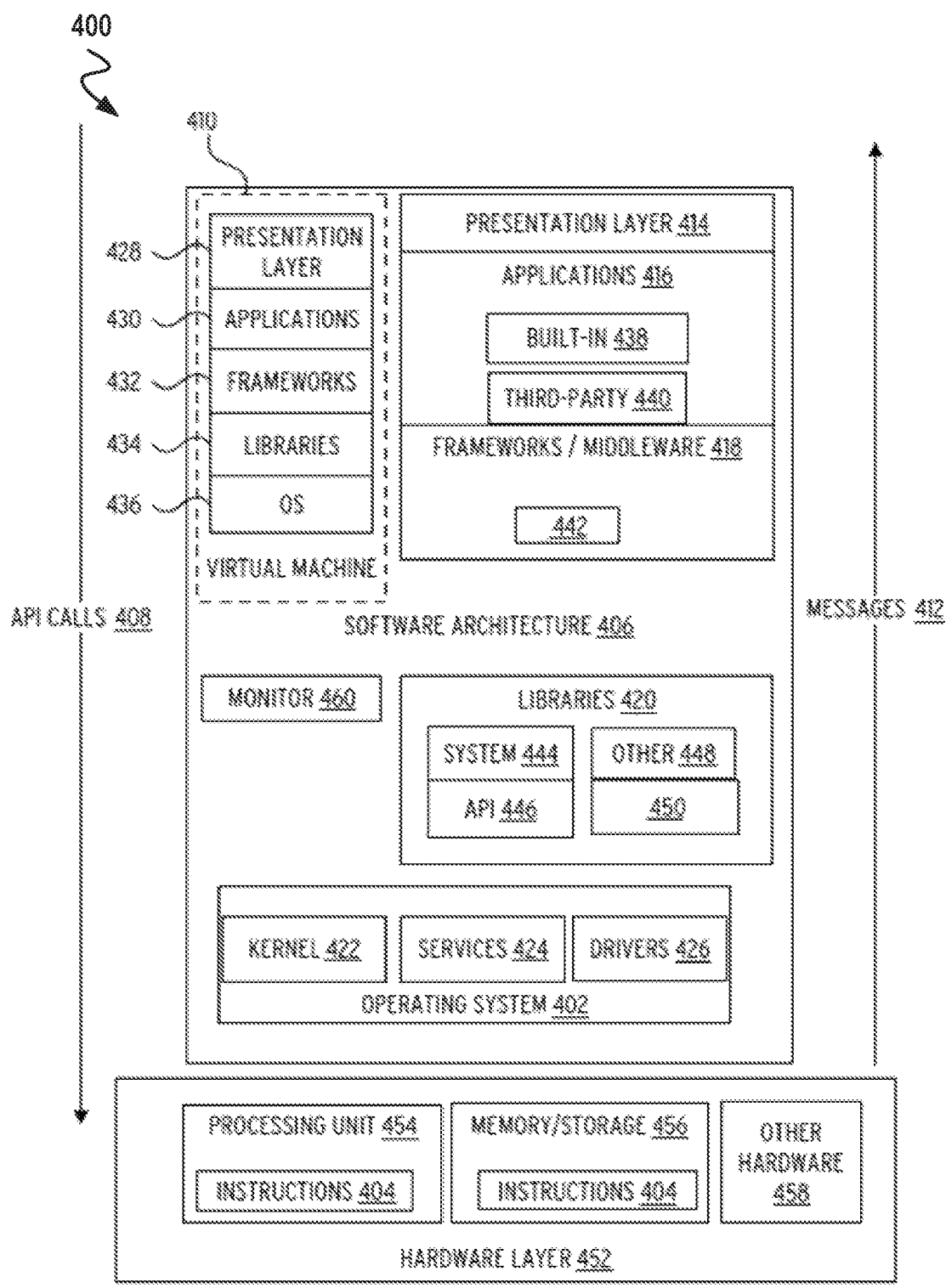
FIG. 4 is a block diagram illustrating a representative software architecture software architecture, according to some example embodiments, which may be used in conjunction with various hardware architectures herein described.

FIG. 4 is a block diagram illustrating an example software architecture 406, which may be used in conjunction with various hardware architectures herein described. FIG. 4 is a non-limiting example of a software architecture and it will be appreciated that many other architectures may be implemented to facilitate the functionality described herein. The software architecture 406 may execute on hardware such as machine 500 of FIG. 5 that includes, among other things, processors 504, memory 514, and I/O components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components and so forth described herein. The hardware layer 452 also includes memory or storage modules memory/storage 456, which also have executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, applications 416 and a presentation layer 414. Operationally, the applications 416 or other components within the layers may invoke application programming interface (API) API calls 408 through the software stack and receive a response as in response to the API calls 408. The layers illustrated are representative in nature and not all software architectures have all layers. For example, some mobile or special purpose operating systems may not provide a frameworks/middleware 418, while others may provide such a layer. Other software architectures may include additional or different layers.

The operating system 402 may manage hardware resources and provide common services. The operating system 402 may include, for example, a kernel 422, services 424 and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 or other components or layers. The libraries 420 provide functionality that allows other software components to perform tasks in an easier fashion than to interface directly with the underlying operating system 402 functionality (e.g., kernel 422, services 424 or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks frameworks/middleware 418 (also sometimes referred to as middleware) provide a higher-level common infrastructure that may be used by the applications 416 or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 416 or other software components/modules, some of which may be specific to a particular operating system or platform.

The applications 416 include built-in applications 438 or third-party applications 440. Examples of representative built-in applications 438 may include, but are not limited to, a contacts application, a browser application, a book reader application, a location application, a media application, a messaging application, or a game application. Third-party applications 440 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built-in operating system functions (e.g., kernel 422, services 424 or drivers 426), libraries 420, and frameworks/middleware 418 to create user interfaces to interact with users of the system. Alternatively, or additionally, in some systems interactions with a user may occur through a presentation layer, such as presentation layer 414. In these systems, the application/component "logic" can be separated from the aspects of the application/component that interact with a user.

Some software architectures use virtual machines. In the example of FIG. 4, this is illustrated by a virtual machine 410. The virtual machine 410 creates a software environment where applications/components can execute as if they were executing on a hardware machine (such as the machine 500 of FIG. 5, for example). The virtual machine 410 is hosted by a host operating system (operating system (OS) 436 in FIG. 4) and typically, although not always, has a virtual machine monitor 460, which manages the operation of the virtual machine as well as the interface with the host operating system (i.e., operating system 402). A software architecture executes within the virtual machine 410 such as an operating system operating system (OS) 436, libraries 434, frameworks 432, applications 430 or presentation layer 428. These layers of software architecture executing within the virtual machine 410 can be the same as corresponding layers previously described or may be different.

Figure 5:
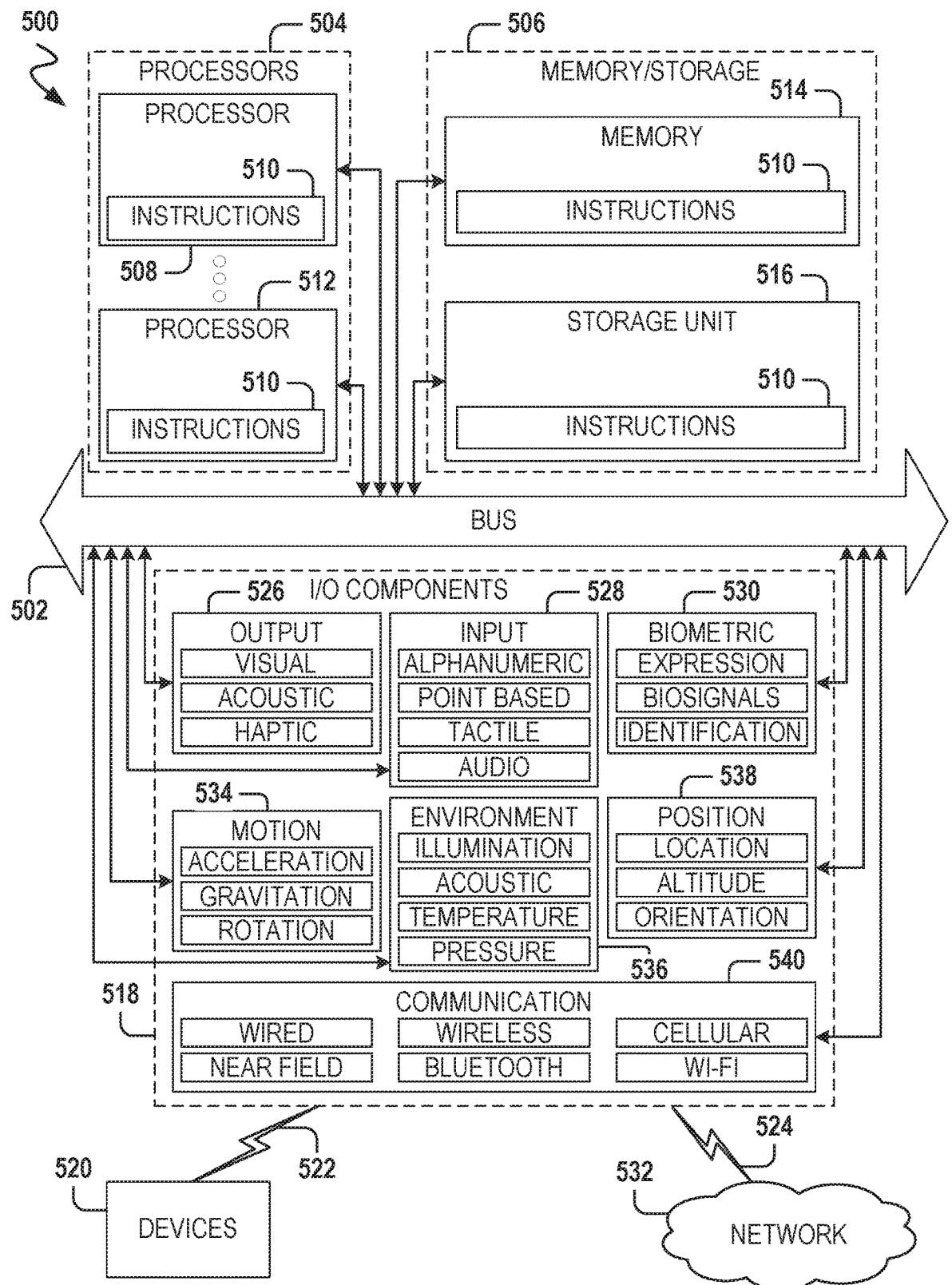
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" shall also be taken to include a collection of machines that individually or jointly execute the instructions 510 to perform any one or more of the methodologies discussed herein.

The machine 500 may include processors 504, memory memory/storage 506, and I/O components 518, which may be configured to communicate with each other such as via a bus 502. The memory/storage 506 may include a memory 514, such as a main memory, or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 518 may include biometric components 530, motion components 534, environmental environment components 536, or position components 538 among a wide array of other components. For example, the biometric components 530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components 534 may include acceleration sensor components (e.g., accelerometer), gravitation sensor components, rotation sensor components (e.g., gyroscope), and so forth. The environment components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via coupling 522 and coupling 524 respectively. For example, the communication components 540 may include a network interface component or other suitable device to interface with the network 532. In further examples, communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a Universal Serial Bus (USB)).

Moreover, the communication components 540 may detect identifiers or include components operable to detect identifiers. For example, the communication components processors communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as, location via Internet Protocol (IP) geo-location, location via Wi-Fi® signal triangulation, location via detecting a NFC beacon signal that may indicate a particular location, and so forth.

Figure 6:
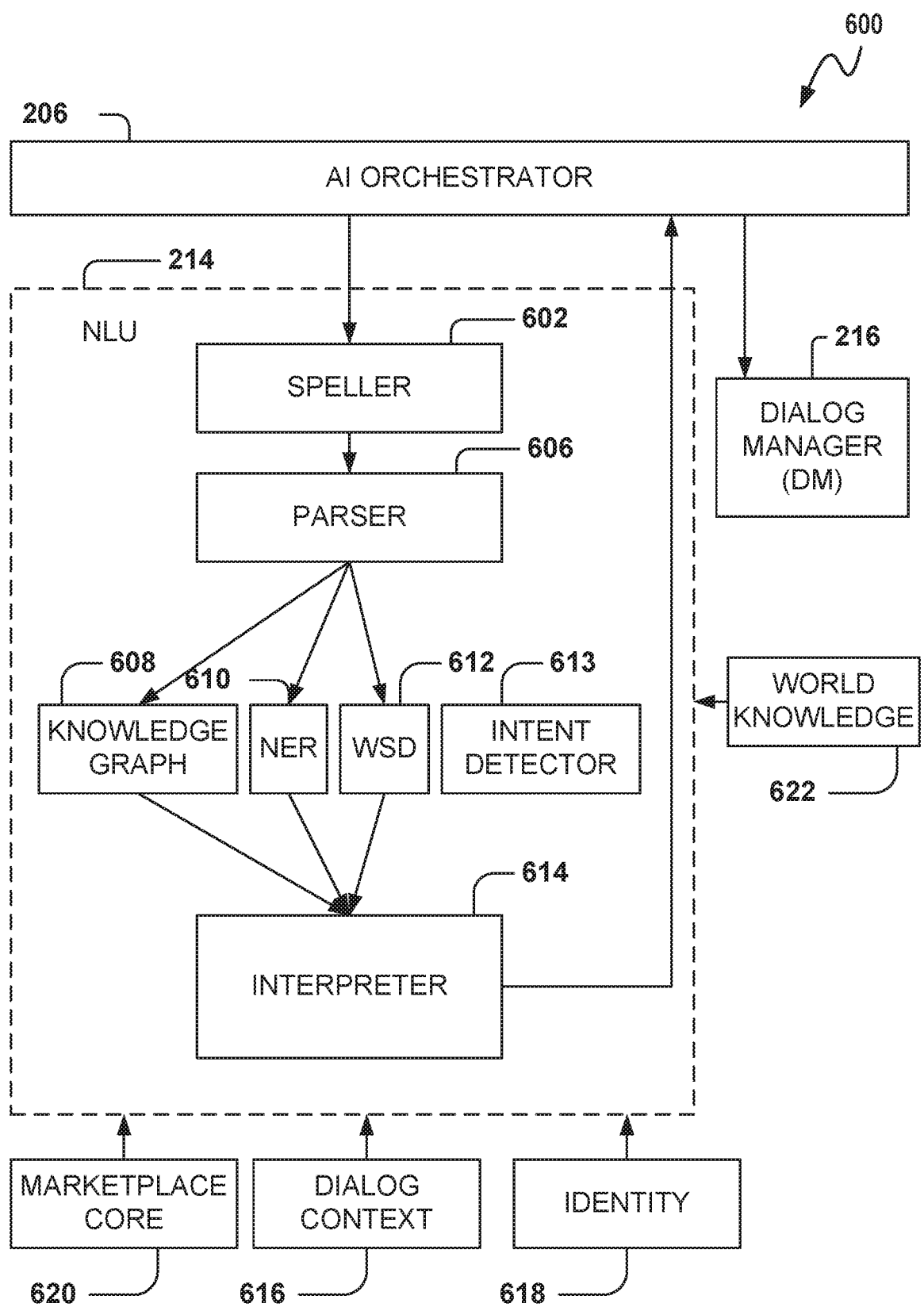
FIG. 6 illustrates an aspect of the subject matter in accordance with one example embodiment.

As mentioned above with reference to FIG. 2, the artificial intelligence framework 128 further includes a natural language understanding or NLU component 214 that operates to parse and extract user intent and intent parameters (e.g., mandatory or optional parameters). The NLU component 214 is shown in FIG. 2 to include sub-components such as a spelling correcter (speller), a parser, a Named Entity Recognition (NER) sub-component, a knowledge graph, and a Word Sense Detector (WSD). An enlarged view of these elements, numbered as shown, is shown in FIG. 6, in conjunction with an aggregator 612. The NLU component 214 communicates and operates in particular with the AI orchestrator 206 and dialog manager 216 as described below.

FIG. 6 shows the NLU component 214, its sub-components, and other components with which it interacts, according to some example embodiments. In some embodiments, extracting a user intent is performed by the NLU component 214 by breaking down this often complex technical problem into multiple parts. Each of the various parts of the overall problem of extracting user intent may be processed by particular sub-components of the NLU component 214, sometimes separately and sometimes in combination.

The sub-components may, for example, comprise a spelling corrector (speller) 602, a machine translator (MT), a parser 604, a knowledge graph 608, a Named Entity Recognition (NER) sub-component 610, a Word Sense Detector (WSD) 612, an intent detector 613, and an interpreter 614. The NLU component 214 receives text, visual selectors, and image attributes (e.g., via the AI orchestrator 206 in one embodiment), and processes each separately or in combination. A visual selector is typically a graphical choice provided by a user, such as the selection of a color from a number of presented color samples, or a selection of emoticon that has an associated and thus selected mental state. The NLU component 214 provides its various outputs, to be described, to the AI orchestrator 206 in one embodiment, to be distributed to other components of the artificial intelligence framework 128 such as the dialog manager 216.

Other inputs considered by the NLU component 214 may include dialog context 616 (e.g., from the context manager 218), user identity information 618 (e.g., from the identity service 222), item inventory-related information 620 (e.g., from the core search engine 220 functions of an electronic marketplace), and external world knowledge 622 to improve the semantic inference of user intent from user input. Different types of analyses of these inputs may each yield results that may be interpreted in aggregate and coordinated via the knowledge graph 808. The knowledge graph 608 may, for example, be based on past users' interactions, inventory-related data, or both.

The speller 602 identifies and corrects spelling mistakes in user-entered text. User text may include, but is not limited to, user queries and item titles. The machine translator 604 may optionally translate user input from the user's natural language into an operating language, including but not limited to English for example. The speller 602 and the machine translator 604 may also coordinate with other normalization sub-components or the parser 606 to process abbreviations, acronyms, and slang into more formal data for improved analysis.

The parser (or dependency parser) 606 assists in detecting the user's intent by finding a dominant object of the user's input query. This process may involve the parser identifying and analyzing noun-phrases including prepositions and direct and indirect objects, verbs, and affirmations and negations in user input such as from a multi-turn dialog. Affirmations and negations may be detected in the intent detector sub-component 613 in some embodiments, or by different sub-components such as the word sense detector 612. In one example embodiment, the parser 606 determines a qualitative term as an adjective immediately preceding the dominant object of the user's input query.

In one embodiment, the parser 606 finds the dominant object of user interest from the longest fragment of the user input that can be fully resolved. The parser 606 may also discard user input terms that are of low content, such as "Hi there" and "Can you help me" and so forth, or replace them with less machine-confusing phrases. The parser 606 may also recognize various occasions (e.g., weddings, Mother's Day, and so forth).

The intent detector 613 may further refine the identification of the user intent by identifying of the dominant objects of interest (which are usually but not always item categories) and the respective best attributes for the results suggested by the parser 606. For example, if the user intent is shopping for a specific item, the knowledge graph 608 may use dominant item categories in a given item inventory (e.g., an eBay inventory, or database/cloud 126) to which it maps. The knowledge graph 608 may also use dominant (e.g., most frequently user-queried or most frequently occurring in an item inventory) attributes pertaining to that item category, and the dominant values for those attributes. Thus, the NLU component 214 may provide as its output the dominant object, user intent, and the knowledge graph 608 that is formulated along dimensions likely to be relevant to the user query. This information may help the dialog manager 216 if there is missing information needed to fully resolve a user query to an item recommendation, and thus whether (and how) to then to prompt the user to further refine the user's requirements via additional input.

The background information for the knowledge graph 608 may be extracted from the item inventory as a blend of information derived from a hand-curated catalog as well as information extracted from historical user behavior (e.g., a history of all previous user interactions with an electronic marketplace over a period of time). The knowledge graph may also include world knowledge extracted from outside sources, such as internet encyclopedias (e.g., Wikipedia), online dictionaries, thesauruses, and lexical databases (e.g., WordNet). For example, data regarding term similarities and relationships may be available to determine that the terms "girl," "daughter," "sister," "woman," "aunt," "niece," "grandmother," and "mother" all refer to female persons and different specific relative familial relationships. These additional associations may clarify the meaning or meanings of user query terms, and help prevent generation of prompts that may educate the bot but annoy the user. Focus group studies have shown that some users do not want to provide more than a predetermined number (e.g., three) of replies to prompts, so each of those prompts should be as incisive as possible.

The knowledge graph 608 may be updated dynamically in some embodiments, for example, by the AI orchestrator 206. That is, if the item inventory changes or if new user behaviors or new world knowledge data have led to successful user searches, the intelligent online personal assistant 106 is able to take advantage of those changes for future user searches. An assistant that learns may foster further user interaction, particularly for those users are less inclined toward extensive conversations. Embodiments may therefore modify the knowledge graph 808 to adjust the information it contains and shares both with other sub-components within the NLU component 214 and externally (e.g., with the dialog manager 216). In another example embodiment, the knowledge graph is updated at regular intervals. In one example, the regular intervals are hourly, daily, weekly, monthly, or other regular interval.

The NER sub-component 610 extracts deeper information from parsed user input (e.g., brand names, size information, colors, and qualitative descriptors) and help transform the user natural language query into a structured query comprising such parsed data elements. The NER sub-component may also tap into world knowledge to help resolve meaning for extracted terms. For example, a query for "a bordeaux" may more successfully determine from an online dictionary and encyclopedia that the query term may refer to an item category (e.g., wine), attributes (e.g., type, color, origin location), and respective corresponding attribute values (e.g., Bordeaux, red, France). Similarly, a place name (e.g., Lake Tahoe) may correspond to a given geographic location, weather data, cultural information, relative costs, and popular activities that may help a user find a relevant item. The structured query depth (e.g., number of tags resolved for a given user utterance length) may help the dialog manager 216 select what further action it should take to improve a ranking in a search performed by the search component 220. In another example embodiment, the NER sub-component 610 limits search results by including a determined quantitative range in the structured query.

The word sense detector 612 processes words that are polysemous, that is, have multiple meanings that differ based on the context. For example, the input term "bank" can refer to an "edge of a river" in a geographic sense or a "financial institution" in a purchase transaction payment sense. The word sense detector 612 detects such words and may trigger the dialog manager 216 to seek further resolution from a user if a word sense remains ambiguous. The word sense detector 612 or the intent detector sub-component 613 may also discern affirmations and negations from exemplary phrases including but not limited to "Show me more" or "No, I don't like that," respectively, and so forth. The functions of the parser 604, the intent detector 613, and the word sense detector 812 may therefore overlap or interact to some extent, depending on the particular implementation.

The interpreter 614 reconciles the analyzed information coming from the various NLU sub-components and prepares output. The output may, for example, comprise a dominant object of a user query, as well as information resolved regarding relevant knowledge graph dimensions (e.g., item categories, item attributes, item attribute values), the user's intent (e.g., in the case of shopping, whether shopping for a specific item, looking for a gift, or general browsing), a type of user statement recognized, the intended target item recipient, and so forth. Through the combination of separate analyses performed on shared, augmented, and processed user inputs, the components of the artificial intelligence framework 128 provide a trusted personal shopper (bot) that both understands user intent and is knowledgeable about a wide range of products. The NLU component 214 thus transforms a natural language user query into a structured query to help provide the most relevant results to a user.

The NLU component 214 therefore improves the operation of the intelligent personal assistant system 106 overall by reducing mistakes, increasing the likelihood of correct divination of user intent underlying a user query, and yielding faster and better targeted searches and item recommendations. The NLU component 214, particularly together with the dialog manager 216 in multi-turn dialog scenarios, effectively governs the operation of the search component 220 by providing more user interaction history-focused or item inventory-focused search queries to execute. This distinctive functionality goes beyond the current state of the art via a particular ordered combination of elements as described.

Examples of use of the NLU component 214 and the intelligent personal assistant system 106 more generally for processing input data from a user are now described. A user may provide a spoken statement like "I am looking for a nice pair of sunglasses for my wife." The NLU component 214 processes this natural language user input to generate a more formal query to be provided to a search engine 220 or dialog manager 216. The more formal query may comprise a group of tags that associate each of one or more resolved handles with a corresponding resolved value. The NLU component also retrieves a quantitative range for sunglasses described as "nice." For example, the more formal structured query may comprise "<intent:gifting, statement-type:statement, dominant-object:sunglasses, target:wife, target-gender:female, price-range:($60-$90)>". A search engine may provide more relevant results based on a search of these tags than would result from a search of the originally submitted user input.

In this example, the intelligent personal assistant system 106 determines that the user intent is gifting (versus merely self-shopping or browsing), that the user has provided a statement (versus a question) and that the dominant object of the user's interest is sunglasses. Although the user is shopping, the intent is to gift the item to a particular target item recipient, his wife. A gifting mission is known to be a special type of a shopping mission that may be handled somewhat differently than general inventory browsing or shopping for an item by the user for the user.

The intelligent personal assistant system 106 also determines that "nice" is a qualitative term used to describe the sunglasses. The intelligent personal assistant system 106 may also discern, typically by the Named Entity Recognizer sub-component 610, that "wife" refers to a female person. The particular individual who is the targeted item recipient may be found from data provided by the identity service 212, for example. Further, through use of world knowledge, the intelligent personal assistant system 106 may determine that the term "wife" refers to a married female person, and that children are generally not married. This information may be helpful in constraining a search to women's sunglasses versus other types of sunglasses (e.g., men's sunglasses, children's sunglasses) to generate a more relevant item recommendation without requiring a user prompt to acquire the same information.

Extracting user intent is crucial for the AI bot in determining what further action is needed. In one ecommerce-related example, at the very highest level, intent could be shopping, chit-chat, jokes, weather etc. If the intent is shopping, it could also be mission, gifting, or browse. Once the high level intent is identified, the artificial intelligence framework 128 needs to understand what the user is looking for, is the need broad (e.g., sneakers, dresses) or more specific (e.g., iPhone 6s) or somewhere in between (e.g., black Nike sneakers).

The artificial intelligence framework 128 can map the user request to certain primary categories and aspects that characterize the items desired. This gives the bot the ability to engage with the user to further refine the requirements. For example, if a user asks the bot for information relating to dresses, the top aspects that need clarification might be color, material and style. Over time, machine learning can add deeper semantics and wider world knowledge to the system, to understand the user intent better. For example "I am looking for a dress for a wedding in June in Italy" means the dress has to be for warm weather and a formal occasion. Another example might include a user asking the bot for "gifts for my nephew." The artificial intelligence framework 128, when trained, will understand that gifting is a special intent that the recipient is male, and that aspects such as age, occasion, and hobbies/likes should be clarified.

In one example embodiment, as more and more users interact with the electronic marketplace using qualitative terms, the intelligent personal assistant system 106 stores the related user interactions and determines a quantitative range for certain products described using certain qualitative terms as described herein. Therefore, over time, the intelligent personal assistant system 106 accommodates more qualitative terms, regions, peoples, languages, and the like.

The word sense detector 612 (or word sense disambiguator) processes words that are polysemous, in other words, having multiple meanings that differ based on the context (e.g. bank: "edge of the river" vs. "financial institute"). The word sense detector 610 detects such words and triggers the dialog manager 216 to seek further resolution (instance.g., in the use cases described above).

The interpreter 614 reconciles the information coming from the various NLU components and prepares an output. In cooperating together, the components of the artificial intelligence framework 128 seek to provide a trusted personal shopper (bot) that understands user intent and is knowledgeable about a wide range of products. The NLU component 214 transforms natural language query to structured query to provide the most relevant results. The NLU component 214 saves the user time by reducing mistakes and increasing the correct interpretation of their words.

Furthermore, the intelligent personal assistant system 106 may correct or question a user's query based, at least in part, on one or more parameters derived from previous query submitted by the user. In one example the user purchases pants with a waist size of 32 inches for her husband. In response to the user requesting pants of size 30 inches, the intelligent personal assistant system 106 may challenge the user by reminding the user that previous pants for that individual were size 32 inches. The dialog manager 216 verifies with the user which size he/she desires. In this way, the intelligent personal assistant system 106 helps to ensure that items purchased four other individuals are most likely to fit.

Referring back to FIG. 2, in one example embodiment, the dialog manager 216 has as sub-components the context manager 218 and the NLG component 212. As mentioned above, the dialog manager 216 operates to understand the "completeness of specificity" and deciding on a next action type and parameter (e.g., "search" or "request further information from user"). The context manager 218 operates to manage the context and communication of a given user towards the bot and its AI. The context manager 218 comprises two parts: a long term history and a short term memory. Each entry describes the relevant intent and all parameters and all related results. The context is towards the inventory, as well as towards other, future sources of knowledge. The NLG component 212 operates to compose a natural language utterance out of an AI message to present to a user interacting with the intelligent bot.

In an ecommerce example of an intelligent bot, an initial key element in seeking to solve this problem is to leverage enormous sets of e-commerce data. Some of this data may be retained in proprietary databases or in the cloud (e.g., database/cloud 126). Statistics about this data are communicated to the dialog manager 216 from the search component 220 as context. The artificial intelligence framework 128 acts directly upon utterances from the user, which are run through the speech recognition component 210, then the NLU component 214, and then are passed to the context manager 218 as semi-parsed data. The NLU component 214 generates human-like questions and responses in text or speech to the user. The context manager 218 maintains the coherency of multi-turn and long term discourse between the user and the artificial intelligence framework 128.

Use of a vast e-commerce dataset requires discrimination to poll for only relevant, useful information. In one example embodiment, the artificial intelligence framework 128 uses results from the search component 220 and intelligence within the search component 220 to provide this information. This information is combined with the history of interaction from the context manager 218. The artificial intelligence framework 128 then must decide the next turn of dialog, whether it should be a question or a "grounding statement" to validate, for example, an existing understanding or user intent, or a recommendation (or, for example, all three). These decisions are made by a combination of the dataset, the chat history of the user, and a model of the user's understanding. The NLG component 212 generates language for a text or spoken reply to the user based on these decisions.

Technical solutions provided by the present inventive subject matter allow users to communicate with an intelligent online personal assistant in a natural conversation. The online assistant is efficient as over time it increasingly understands specific user preferences and is knowledgeable about a wide range of products. Though a variety of convenient input modalities, a user can share photos, use voice or text and the assisted user experience is akin to talking to a trusted, knowledgeable human shopping assistant in a high-end store, for example.

Referring again to FIG. 2, the search component 220 is designed to serve several billion queries per day globally against very large high quality inventories. The search component 220 can accommodate text, or Artificial Intelligence (AI) encoded voice and image inputs, and identify relevant inventory items to users based on explicit and derived query intents and use of one or more qualitative terms.

Traditional searching, particularly in e-commerce, while continuing to improve, still suffers from the following obstacles. From a user perspective, relevance is lost. Users do not always get what they look for because the search engine may understand keywords but not necessarily the underlying search intent. Further, most online stores either do not know who the users are or do not personalize the experience beyond basic recommended products. Input modalities are limited. Traditional search uses text only, and the responses to users, particularly with truly relevant content, are not fast enough. From a search host perspective, legacy systems are complex and expensive to build and maintain. Existing systems do not allow rapid experimentation and improvement. They also do not have the flexibility to allow rapid business-metric-driven optimization.

In the present approach, several synergistic components are utilized together. First, AI is used to enhance an initial query (e.g. text, voice, image, and video) understanding and product understanding. Second, deep learning is applied to user search intent to operations such as product matching, relevance ranking/filtration, and final re-ranking. Thirdly, the search component 220 is designed to operate as a platform that can host machine learning (or deep learning) components in a plug-n-play fashion. Fourth, user-specific signals are used throughout a search stack. Finally, 3rd-party system technologies are leveraged to further simplify the stack, improve its quality and performance, and shorten development cycles.

Figure 7:
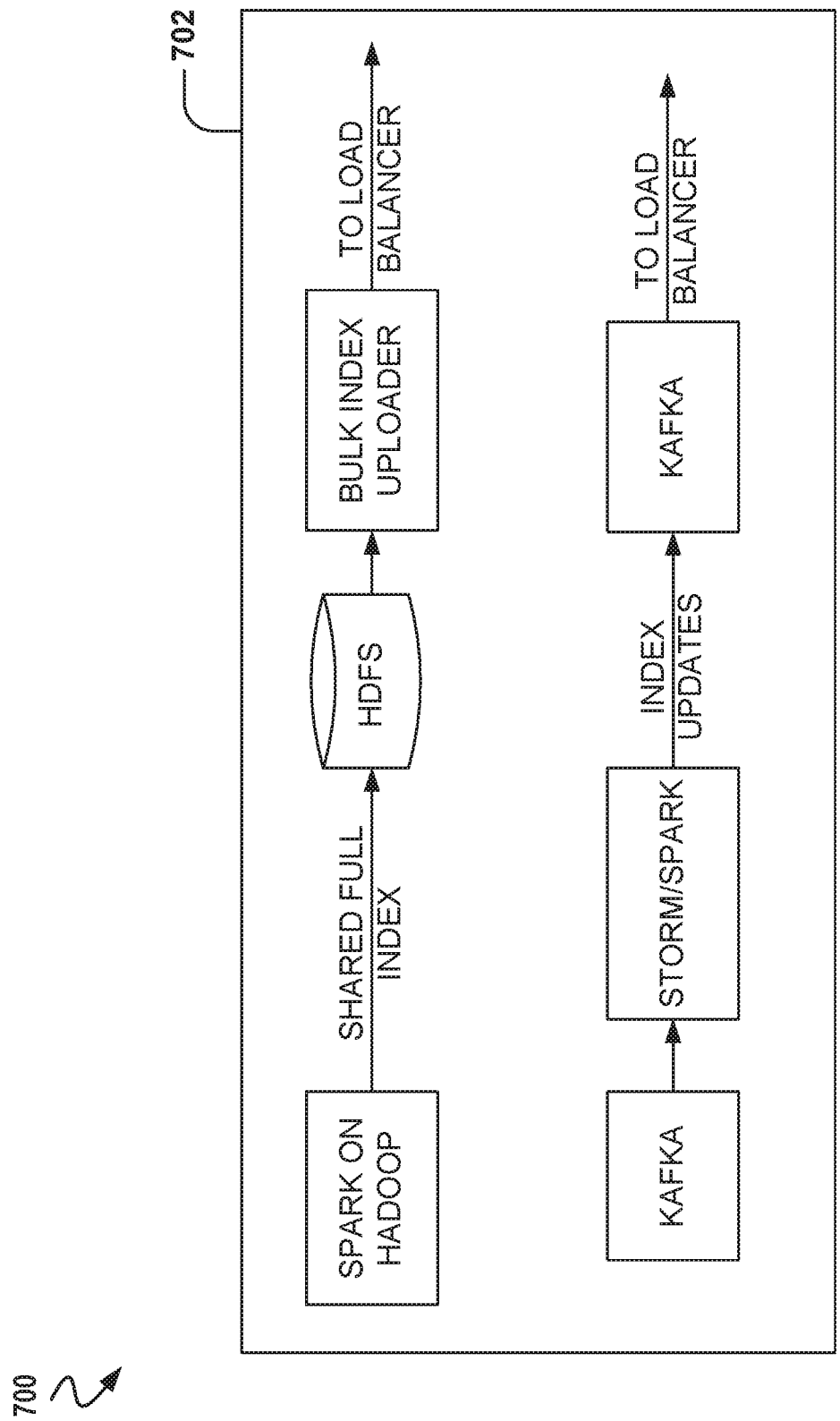
FIG. 7 illustrates another aspect of the subject matter in accordance with one embodiment.
Figure 8:
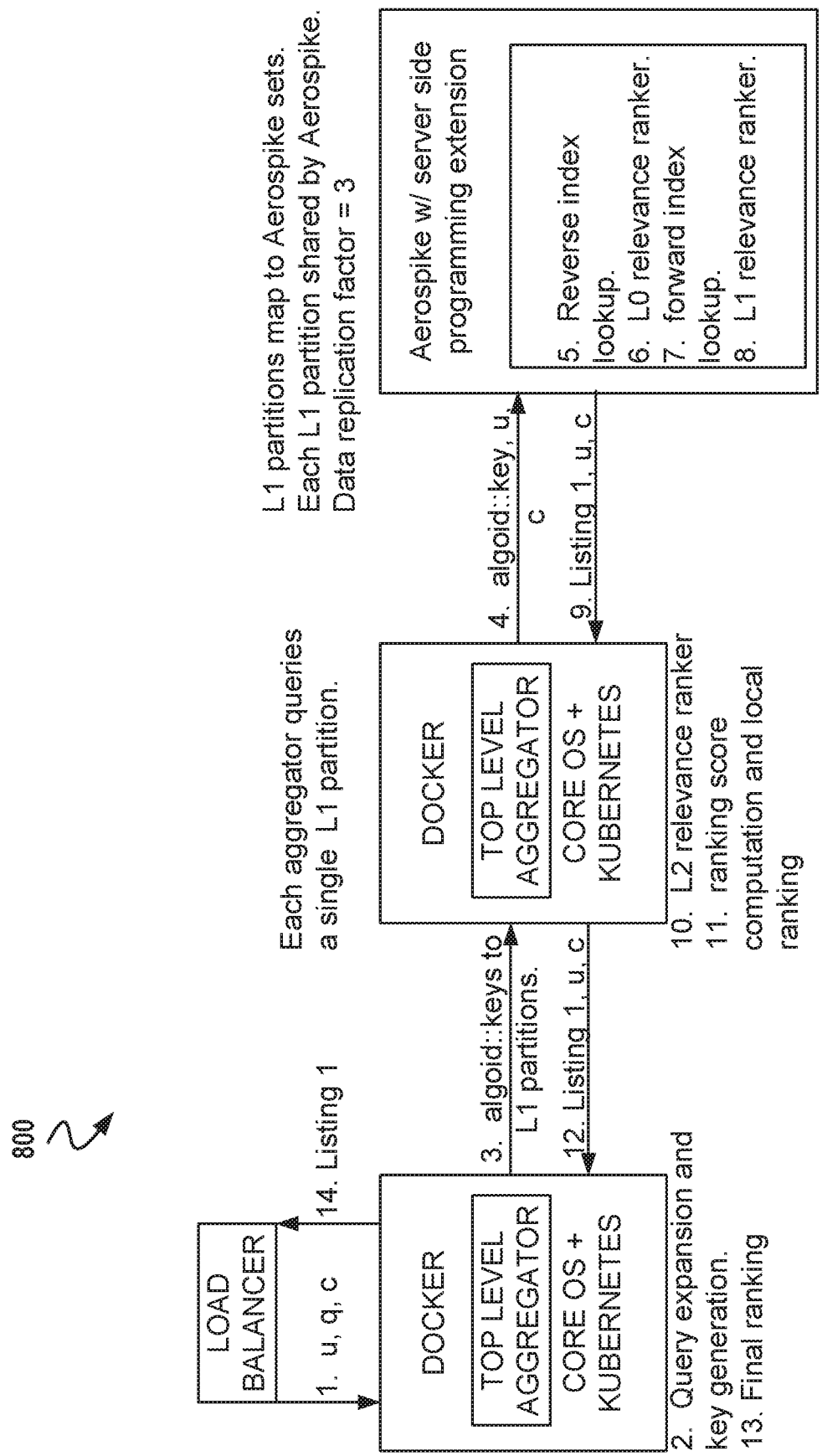
FIG. 8 illustrates an aspect of the subject matter in accordance with another embodiment.

To this end, the search component 220 has, in one example, the following components that perform certain functions. With reference to FIG. 7 and FIG. 8, an index generation pipeline has an index generation and uploading/updating stack 702. The pipeline uses Lucene to generate n-gram based and AI's Named Entity Service to generate entity-based search index sets. Additional future pipelines include Deep-Learned semantic vector-based search index set. The index generation pipeline uses BM25, predicted search key to product click-through-rate, predicted search key leaf category, and other Information Retrieval (IR) and Machine Learning (ML) techniques to trim the search index. The index generation pipeline also generates memorized head query to product index set. While the exact techniques will evolve, this multi-search-index-sets, offline index trimming, and offline memorization paradigm allows the online serving stack to start the filtration funnel with a high recall set that has a fairly high precision, contributing to a low latency system that produces high precision/recall search results. The index generation pipeline uses Spark to scale linearly. Further, it is Dockerized for easy and high-fidelity deployment globally.

The search index is updated near-real-time (NRT) through a platform configured to build real-time data pipelines and streaming applications (e.g., Kafka). The platform directly writes to the index store, which is built on top of a high performance database (e.g., Aerospike). The impact of index updates to search latency is minimal due to the database's high read-write concurrency. The time from when a product is listed to when it is available for searching is within a few seconds and may become as fast as sub-second. This is not possible with a traditional approach of using delta indexes. Bulk index loading happens on-demand when algorithmic improvement for index generation needs to roll out or when index repairing is needed.

For a serving phase, the database is a fast and easily scalable key-value pair store. The serving stack reaches extremely high throughput and low latency by leveraging this speed and scalability, but further by revising the database server to host early-level relevance filtration logic for network I/O reduction and by introducing client-side sharding. The average latency will be within 50 milliseconds and can conveniently be scaled out to serve several billion query a day with less than a few hundred nodes. By leveraging container technologies (Dockers) and commercial cloud capabilities, the global deployment of the system can be rendered conveniently. Two design elements of the serving stack can power rapid experimentation and evolvement over time. First, matching, multiple levels of relevance filtration/ ranking, and final re-ranking logics are enabled as science modules. Second, the different pieces of the algorithms provided by the science modules can be individually tweaked or combined differently through configuration. Both the science modules and the configuration can conveniently be deployed while the serving stack is running.

In example matching, relevance, and final re-ranking phases, deep learning models, deep neural network (DNN), recurrent neural network (RNN), convolutional neural network (CNN), and long short-term CNN, as well as other ML models and IR models are used. The search component 220 uses n-gram, entity, and semantic vector-based query to product matching. Deep-learned semantic vectors gives the ability to match products to non-text inputs directly. Multi-leveled relevance filtration uses BM25, predicted query leaf category+product leaf category, semantic vector similarity between query and product, and other models, are used to pick the top candidate products for the final re-ranking algorithm. Predicted click-through-rate and conversion rate as well as gross merchandise value constitutes a final re-ranking formula that allows the artificial intelligence framework 128 to tweak towards specific business goals, more shopping engagement, more products purchased, or more GMV. Both the click prediction and conversion prediction models take in query, user, seller, and product as input signals. Using profiles, the artificial intelligence framework 128 learns from onboarding, sideboarding, and user behaviors enhance the precision of the models used by each of the matching/relevance/ranking stages for individual users.

Again with reference to FIG. 7 and the index generation and uploading/updating stack 702, index elements can include a reverse index and a forward index with two level sharding, one explicit to the business logic on the client nodes. A reverse index may include: algoid::key→list of listingIds+static scores, built offline with selection algorithms. A forward index may include: listingId→listing (seller-provided and model-derived) attributes for models and serving. Product identification codes and attributes can be incorporated in further examples.

FIG. 8 shows aspects of an example serving stack 800. This stack includes the elements as shown to perform the steps as illustrated. One example of index generation within artificial intelligence framework 128 includes a rich set of models/algorithms and a flexible framework to adopt future ones to increase recall/precision, and to offload work from the serving time. It also includes ngram-based and entity-based selection streams (e.g., search indexes keyed off ngrams or entities derived from products/listings), and leverages Lucene for ngram-based stream generation and AI's Name Entity Recognition for entity-based stream generation. The index generation adds Deep-Learned semantic-vector-based selection streams and memorizes head query-listing/product's and rank against other candidates, less serving-time work. Some examples use Spark to scale on commercial cloud and generate entire index set daily and per selection algorithm update. Some examples generate index updates in near-real-time and leverage structured data from Core for product-centric search indexes.

Index uploading and updates can be set daily for an entire index or per a selection algorithm update. For example, Aerospike's throughput is very high, and the entire index can be updated in under 2 hours. By leveraging Aerospike's high throughput and offloading work from serving time to index generation, the search component 220 can handle production scale search traffic with very modest sized clusters, for example <30 CPU nodes per cluster, 3 clusters per Data Center. Excess search capacity can be built in to handle the failure of an entire Data Center, peak-season days, and peak hours during the days, at modest cost. Such excess capacity and short index update time lend to a simple bulk-uploading strategy of bringing down two clusters a time for uploading, one per Data Center. As a result, no rolling updates or complex state tracking/management are needed. An elastic architecture can be employed that utilizes the excess capacity when it is not in use, and indexes can be streamed in near-real-time. One example of the artificial intelligence framework 128 uses open source tool (Kafka) or commercial tool (Google PubSub) for high-throughput and robust streaming of index updates, and writes directly to Aerospike, a 10-node Aerospike cluster can handle concurrent read-write at the scale of commercial production volume with extremely low latency Serving can be deployed, globally leveraging container technologies (e.g., Dockers) and commercial cloud capability (e.g., Google Cloud, AWS, and Azure). Robust, efficient, and flexible load balancing can be built in with a commercial cloud service. A serving service (e.g., serving stack 802) can be dockerized and managed by Kubernetes, for example, for high fidelity deployment and robust recovery.

In one example embodiment, science components utilize deep learning for multi-leveled relevance ranking and filtration, and offline pipeline for model evaluation and optimization. The science components build Deep Learning models for generating new selection streams and machine learning/deep learning models for click prediction and conversion prediction. The components add formula-based final ranking algorithms with factors from click prediction, conversion prediction, and GMV to target specific business goals, and work with image and voice recognition teams to add capability for direct image and voice searches without text as a middle instrument.

With reference back to FIG. 2, the artificial intelligence framework 128 is seen to comprise, or operate in association with, the identity service 222. The identity service 222 includes a set of policies, APIs, and services that elegantly centralizes all user information, enabling the artificial intelligence framework 128 to have "intelligent" insights into user intent. The identity service 222 can protect online retailers and users from fraud or malicious use of private information.

Conventionally, the approach and data used by online shopping systems aim at a faceless demographic group of buyers with blunt, simplified assumptions to maximize short-term revenue. Conventional sites and apps do not understand how, why, and when users want to be notified. Notifications are annoying, inappropriate, and impersonal, oblivious to each user's preferences. One person is not the same as a single account. People share accounts and devices. Passwords make platforms neither safe nor easy to use. Weak online identity and ignoring environmental signals (such as device, location, notification after anomalous behavior) make it easy to conduct fraud in the marketplace.

On the other hand, the identity service 222 of the present disclosure provides many advantages. The identity service 222 is a single central repository containing user identity and profile data. It continuously enriches the user profile with new insights and updates. It uses account linking and identity federation to map relationships of a user with a company, household, other accounts (e.g., core account), as well as a user's social graph of people and relationships. The identity service 222 evolves a rich notification system that communicates all and only the information the user wants at the times and media they choose.

In one example embodiment, the identity service 222 concentrates on unifying as much user information as possible in a central clearinghouse for search, AI, merchandising, and machine learning models to maximize each component's capability to deliver insights to each user. A single central repository contains user identity and profile data in a meticulously detailed schema. In an onboarding phase, the identity service 222 primes a user profile and understanding by mandatory authentication in a bot application. Any public information available from the source of authentication (e.g., social media) is loaded. In a sideboarding phases, the identity service 222 augments the profile with information about the user that is gathered from public sources, user behaviors, interactions, and the explicit set of purposes the user tells the AI (shopping missions, inspirations, preferences). As the user interacts with the artificial intelligence framework 128 the identity service 222 gathers and infers more about the user and stores the explicit data, derived information, and update probabilities and estimations of other statistical inferences. Over time, in a profile enrichment phases, the identity service 222 also mines behavioral data such as clicks, impressions, and browse activities for derived information such as tastes, preferences, and shopping verticals. In an identity federation and account linking phases, when communicated or inferred, the identity service 222 updates the user's household, employer, groups, affiliations, social graph, and other accounts, including shared accounts.

Figure 9:
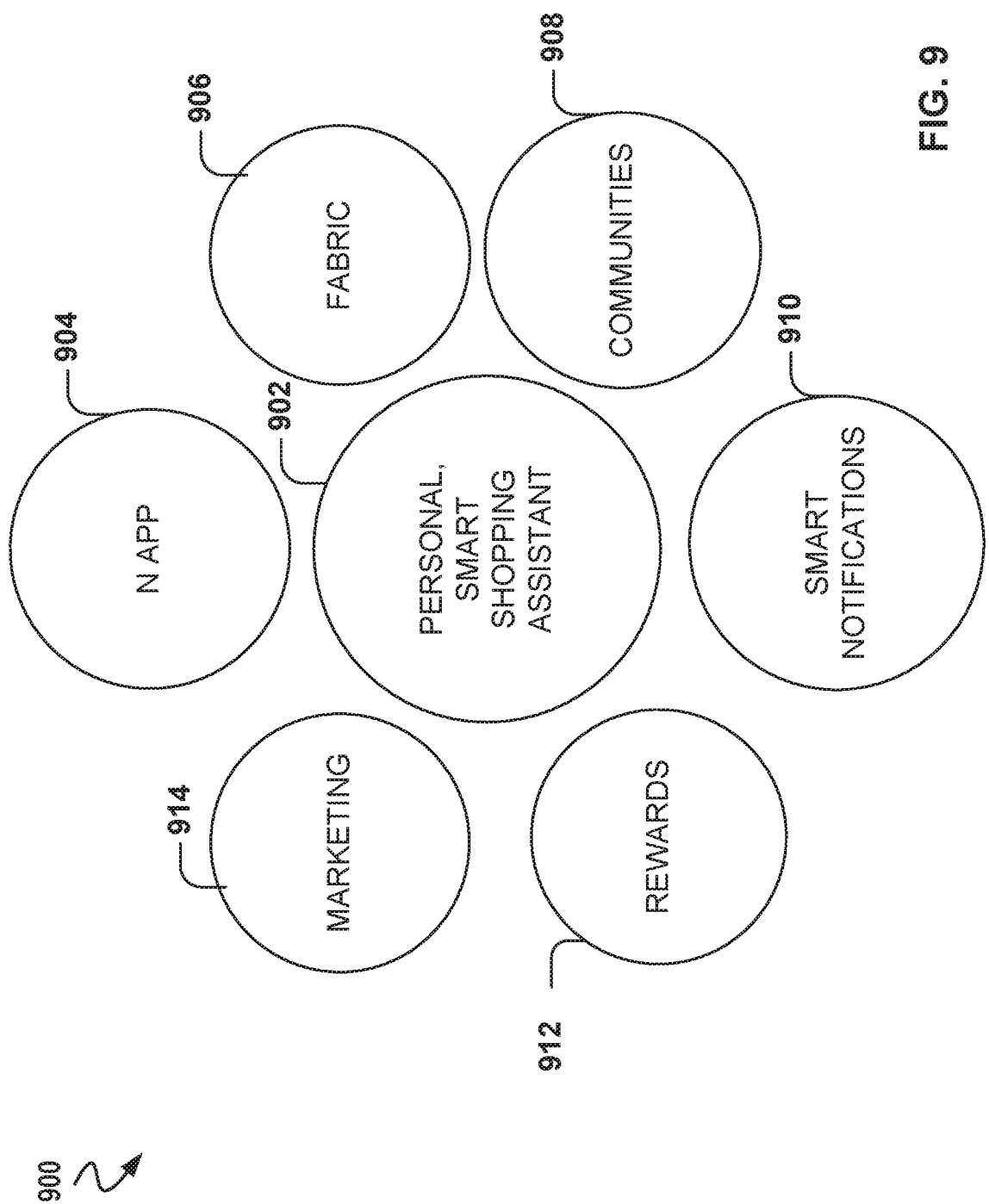
FIG. 9 illustrates an aspect of the subject matter in accordance with one example embodiment.

With reference now to FIG. 9, an example environment 900 into which an intelligent online personal assistant provided by the intelligent personal assistant system 106 can be deployed is shown. At the center of the environment 900, the intelligent bot 902 with AI appears. The bot leverages the NLU component 214, the dialog manager 216, the NLG component 212, the search component 220, and identity service 222 to engage users in efficient, interesting, and effective dialog to decode their intent and deliver personalized results.

An associated application (e.g., app 904, termed N app) can showcase a bot 902's full power and intelligence with compelling mobile design capabilities and elements. A fabric 906 integrates with Facebook Messenger, Skype, and Cortana, for example, to enable users to transact where they are already spending time. A smart notifications 910 platform delivers the right information at the right time via any number of channels (e.g., SMS, push notification, email, messaging) to users to encourage them to engage with the bot 902 and associated marketplaces. Communities 908 features enable users to connect, engage, and interact with their friends, tastemakers, and brands using the same messaging systems in which they already spend most of their time. Other features include group buying and gift buying. A rewards 912 platform incentivizes users to engage more deeply with the bot 902. Rewards can include deep discounts on products, access to unique inventory, and recognition in the app through scores, levels, etc. At marketing 914, a combination of traditional, social, and other marketing is performed to win the attention of some populations (e.g., millennials) in more personal ways. Conventional techniques can include merchandising, email, SEO, and SEM as well as experimental techniques such as social ads, viral coupons, and more to target new and existing users.

Figure 10:
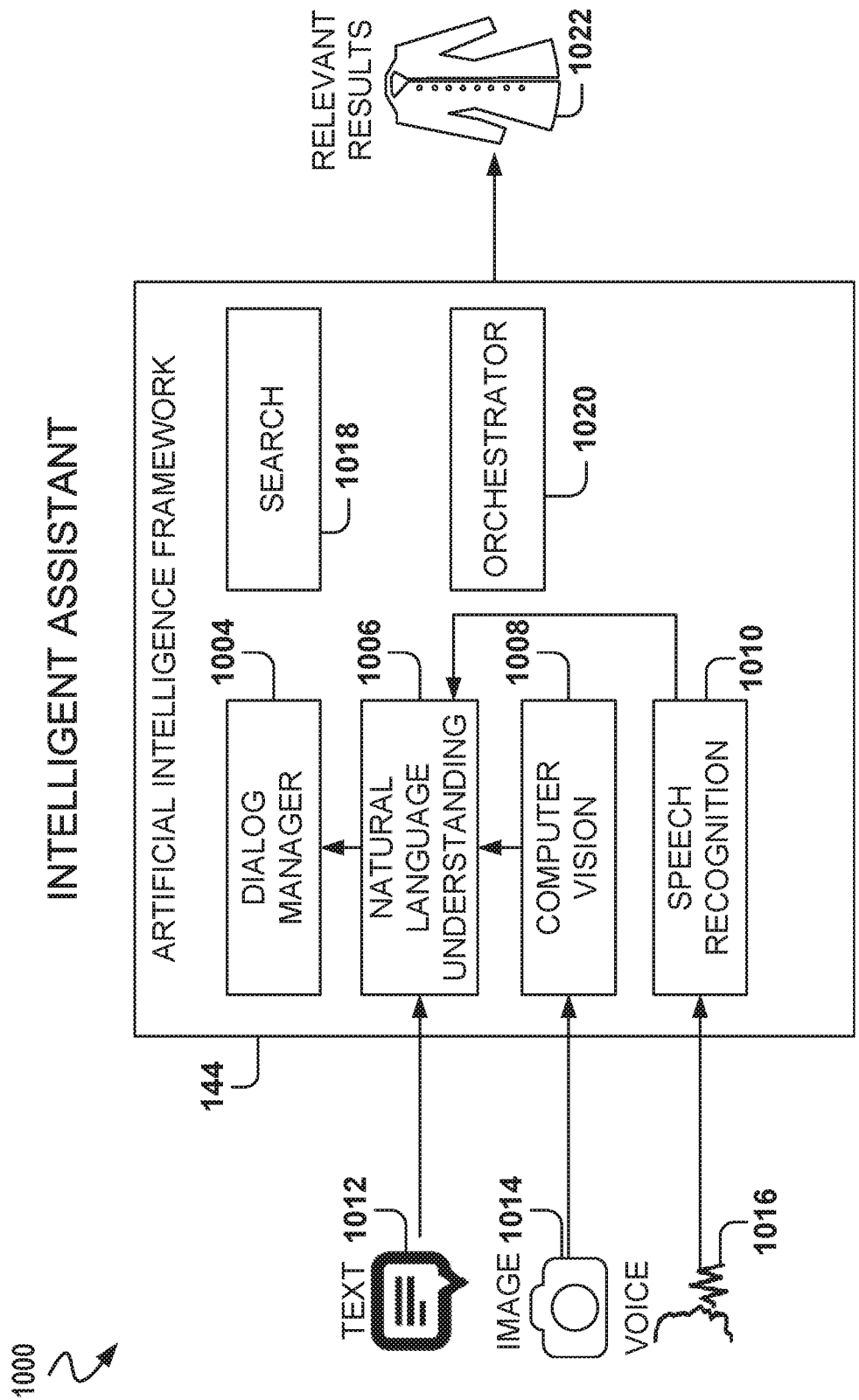
FIG. 10 is a block diagram illustrating one example embodiment of a system for applying a quantitative range for qualitative terms.

FIG. 10 is a block diagram illustrating one example embodiment of a system for applying a quantitative range for qualitative terms. In one example embodiment, the system includes an artificial intelligence framework 104. In this example embodiment, the artificial intelligence framework 128 receives text 1012, an image 1014, or voice 1016. After processing the inputs received as described herein, the artificial intelligence framework 128 may generate relevant results 1022.

In one example embodiment, the received text 1012 includes a qualitative term and the relevant results 1022 are limited to results available within a quantitative range associated with the qualitative term for this particular product. In another example embodiment, the voice 1016 expresses a qualitative term. In one example, the artificial intelligence framework 128 receives text by a user entering text using a keyboard. In another example, the artificial intelligence framework 128 receives an image by a user uploading an image. In another example, the artificial intelligence framework 128 receives voice by recording a user's speech and processing the audio signal.

The artificial intelligence framework 128 transforms natural language text into a machine readable format. In response to receiving input from the user, the artificial intelligence framework 128 generates a machine-readable database. The artificial intelligence framework 128 analyzes linguistic structures, usage of world knowledge, and inference as previously described.

In one example embodiment, the artificial intelligence framework 128 constructs a structured query representing the query received from the user. In one example the user indicates, "I am looking for a cheap pair of sunglasses for my wife." Accordingly, the artificial intelligence framework 128 generates a structured query that includes "<intent: shopping, statement-type:statement, dominant-object:sunglasses, target:wife, target-gender:female, price-range:($1, $10)>."

Figure 11:
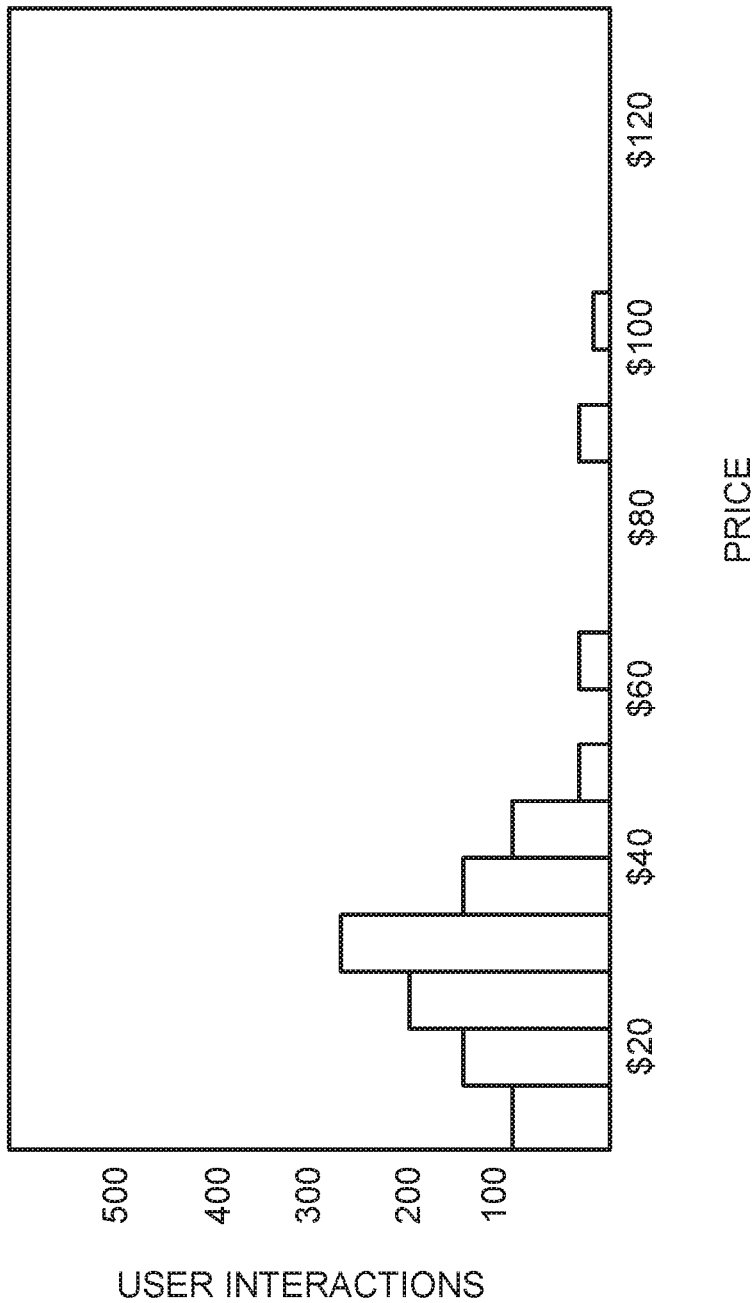
FIG. 11 is a chart illustrating user interaction data used to apply a quantitative range for qualitative terms, in accordance with one embodiment.

FIG. 11 is a chart illustrating user interaction data used to apply a quantitative range for qualitative terms, in accordance with one embodiment. As depicted in FIG. 11, the intelligent personal assistant system 106 stores user interactions for users searching for shoes and using the qualitative term "cheap."

In this example embodiment, the intelligent personal assistant system 106 applies a quantitative range for "cheap shoes." In one example, the intelligent personal assistant system 106 calculates the quantitative range by combining all of the relevant user interactions and removing 10% user interactions at the bottom price and the top % 10 resulting in the 80% of the user interactions in the middle. In this example, the quantitative range is the price range of the products associated with the 80% remaining user interactions.

In another example embodiment, the quantitative range includes the price range from the lowest price of the product with 200 user interactions or more and the highest price of the product with 200 user interactions or more user interactions. Of course, one skilled in the art may recognize other numerical methods to determine a numerical range that represents a set of numbers and this disclosure is meant to include all such numerical methods.

As depicted in FIG. 11, in one embodiment, the intelligent personal assistant system 106 determines that the quantitative range of prices for "cheap shoes" is between $20 and $40 because there are more than 100 user interactions at prices between $20 and $40.

Figure 12:
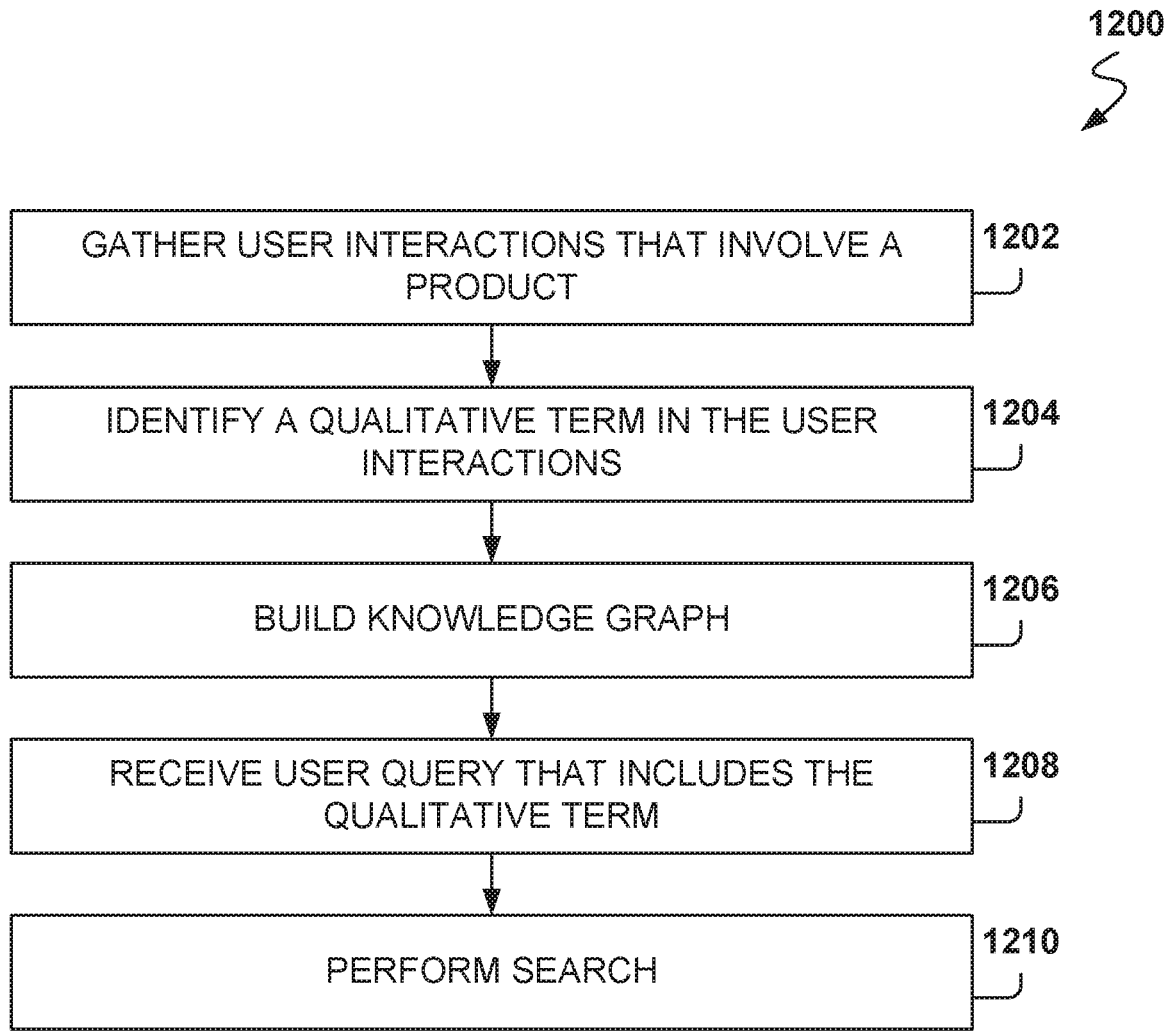
FIG. 12 is a flow chart diagram illustrating one example embodiment of a method for applying a quantitative range for qualitative terms to enhance a user query.

FIG. 12 is a flow chart diagram illustrating one example embodiment of a method 1200 for applying a quantitative range for qualitative terms to enhance a user query. Operations in the method may be performed by the artificial intelligence framework 128.

In one example embodiment, the method 1200 begins and at operation 1202 the intelligent personal assistant system 106 gathers user interactions involving a product. In one example, the user interactions are at an electronic marketplace. The method 1200 continues at operation 1204 and the intelligent personal assistant system 106 identifies, using natural language processing, a qualitative term included in the user interactions. The method 1200 continues at operation 1206 and the intelligent personal assistant system 106 builds a knowledge graph that associates a quantitative range for the product identified using the qualitative term according to values in the user interactions that include the qualitative term. In one example, the values are prices for products.

The method 1200 continues at operation 1208 and the intelligent personal assistant system 106 receives a query for the product that includes the qualitative term. The method 1200 continues at operation 1210 and the intelligent personal assistant system 106 performs, in response to receiving the query, a search that limits results according to the quantitative range associated with the qualitative term stored in the knowledge graph.

Figure 13:
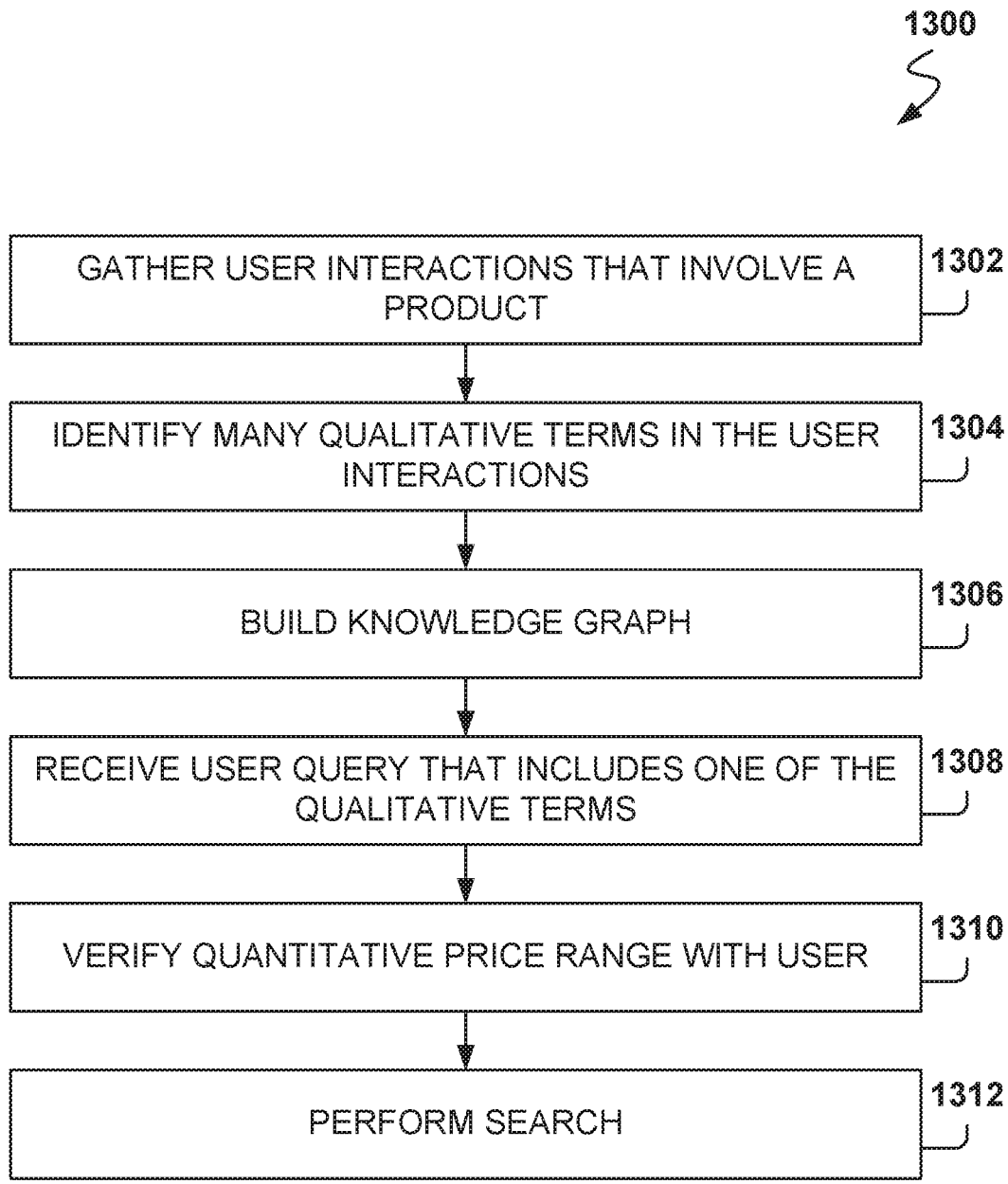
FIG. 13 is a flow chart diagram illustrating another example embodiment of a method for applying a quantitative range for qualitative terms to enhance user queries.

FIG. 13 is another flow chart diagram illustrating one example embodiment of a method for determining a quantitative price for qualitative terms to enhance user queries. Operations in the method may be performed by the artificial intelligence framework 128.

In one example embodiment, the method 1300 begins and at operation 1302 the intelligent personal assistant system 106 gathers user interactions involving a product at an electronic marketplace. The method 1300 continues at operation 1304 and the intelligent personal assistant system 106 identifies, using natural language processing, many qualitative terms included in the user interactions. In one example, the intelligent personal assistant system 106 identifies qualitative terms in response to the respective terms being used more than 500 times in the user interactions.

The method 1300 continues at operation 1306 and the intelligent personal assistant system 106 determines a quantitative range for each of the identified qualitative terms according to the prices in the user interactions that include the respective qualitative terms. In one example, the intelligent personal assistant system 106, or a component thereof, builds a knowledge graph that associates the qualitative terms with a quantitative range of values based, at least in part, on values included in the user interactions that involve the product.

The method continues at operation 1308 and the intelligent personal assistant system 106 receives a query for the product that includes one of the qualitative terms. The method 1300 continues at operation 1310 and the intelligent personal assistant system 106 verifies with the user that submitted the query whether to apply the quantitative range to the query results. In one example, the intelligent personal assistant system 106 causes a question to appear on a user interface being used by the user, the user interface configured to receive a response from the user.

In response to an affirmative reply, the method 1300 continues at operation 1312 and the intelligent personal assistant system 106 performs, in response to receiving the query, a search that limits results according to the quantitative range associated with the qualitative term stored in the knowledge graph.

According to the various method and system described herein, an artificial intelligence framework 128 enhances a user request with semantic information gathered from variety of sources. In one example embodiment, a request includes domain specific user behavior from user logs including user interactions. In one example embodiment, the system learns that girl's shoes come in sneakers, flats, or the like. In another example embodiment, the system learns that a "daughter" is female and that "fancy heels" are women's high-heel shoes priced between $200 and $300. Based on world knowledge available via, for example, WikiData, Wikipedia, WordNet, or the like, the systems learns a variety of inferred indicators included in a user's request.

In one example embodiment, a knowledge graph is structured with nodes (data), and edges (relationships). In one example embodiment, the knowledge graph is implemented using an industry standard database. Accordingly, the artificial intelligence framework 128 can infer categories, names, values based, at least in part, on semantic inference from world knowledge. Furthermore, as world knowledge grows, the artificial intelligence framework 128 increases in capability.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example embodiment, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code") and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, eBay Inc., All Rights Reserved.

What is claimed is:

1. A system for providing search results relevant to a qualitative term for an attribute of a product, the system comprising:
   a machine-readable medium having instructions stored thereon, which, when executed by a processor, causes the system to perform operations comprising:
   identifying historical user interactions with historical search results for the product returned in response to historical search queries for the product, each of the historical search queries comprising at least one of a plurality of qualitative terms;
   determining a quantitative range associated with each of the qualitative terms of the plurality of qualitative terms for the product based on values for the attribute of the product identified from information about the product from the historical search results;
   adjusting the quantitative ranges for each qualitative term so that the quantitative ranges do not overlap;
   storing an association between the qualitative term and the quantitative range for the attribute of the product;
   receiving a query for the product that includes a qualitative term, the qualitative term being one of the plurality of qualitative terms;
   performing, in response to the query including the qualitative term, a search that identifies search results relevant to the qualitative term by identifying the search results in which the attribute of the product has a value within the quantitative range associated with the qualitative term; and
   providing the search results relevant to the qualitative term for presentation in response to the query.

2. The system of claim 1, wherein the operations further comprise updating the quantitative range at a regular interval to account for more recent historical user interactions that involve the product.

3. The system of claim 1, wherein identifying the qualitative term is based on a threshold number of historical user interactions that include the qualitative term and the product.

4. The system of claim 1, wherein the information about the historical user interactions is limited to a specific country, region, or user.

5. The system of claim 1, wherein the operations further comprise verifying with a user of the networked service whether to limit the search results using the quantitative range.

6. The system of claim 1, wherein the information about the historical user interactions comprises at least one of: user views, user clicks, or user purchases.

7. A method for providing search results relevant to a qualitative term for an attribute of a product, the method comprising:
   identifying historical user interactions with historical search results for the product returned in response to historical search queries for the product, each of the historical search queries comprising at least one of a plurality of qualitative terms;
   determining a quantitative range associated with each of the qualitative terms of the plurality of qualitative terms for the product based on values for the attribute of the product identified from information about the product from the historical search results;
   adjusting the quantitative ranges for each qualitative term so that the quantitative ranges do not overlap;
   storing an association between the qualitative term and the quantitative range for the attribute of the product;
   receiving a query for the product that includes a qualitative term, the qualitative term being one of the plurality of qualitative terms;
   performing, in response to the query including the qualitative term, a search that identifies search results relevant to the qualitative term by identifying the search results in which the attribute of the product has a value within the quantitative range associated with the qualitative term; and
   providing the search results relevant to the qualitative term for presentation in response to the query.

8. The method of claim 7, further comprising updating the quantitative range at a regular interval to include more recent historical user interactions.

9. The method of claim 7, wherein identifying the qualitative term is based on a threshold number of historical user interactions that include the qualitative term and the product.

10. The method of claim 7, wherein the information about the historical user interactions is limited to a specific country, region, or user.

11. The method of claim 7, further comprising verifying with a user of the networked service whether to limit the search results using the quantitative range.

12. The method of claim 7, wherein the information about the historical user interactions is limited to a recent threshold period of time.

13. The method of claim 7, further comprising identifying a plurality of qualitative terms in the historical user interactions involving the product, determining a respective quantitative range for each of the qualitative terms, and adjusting the quantitative ranges so that the quantitative ranges do not numerically overlap.

14. A machine-readable hardware medium having instructions stored thereon, which, when executed by one or more processors of a machine, cause the machine to perform operations for providing search results relevant to a qualitative term for an attribute of a product, the operations comprising:

identifying historical user interactions with historical search results for the product returned in response to historical search queries for the product, each of the historical search queries comprising at least one of a plurality of qualitative terms;

determining a quantitative range associated with each of the qualitative terms of the plurality of qualitative terms for the product based on values for the attribute of the product identified from information about the product from the historical search results;

adjusting the quantitative ranges for each qualitative term so that the quantitative ranges do not overlap;

storing an association between the qualitative term and the quantitative range for the attribute of the product;

receiving a query for the product that includes a qualitative term, the qualitative term being one of the plurality of qualitative terms;

performing, in response to the query including the qualitative term, a search that identifies search results relevant to the qualitative term by identifying the search results in which the attribute of the product has a value within the quantitative range associated with the qualitative term; and providing the search results relevant to the qualitative term for presentation in response to the query.

15. The machine-readable hardware medium of claim 14, wherein the operations further comprise updating the quantitative range at a regular interval.

16. The machine-readable hardware medium of claim 14, wherein identifying the qualitative term is based on a threshold number of historical user interactions that include the qualitative term and the product.

17. The machine-readable hardware medium of claim 14, wherein the information about the historical user interactions is limited to a specific country, region, or user.

18. The machine-readable hardware medium of claim 14, wherein the information about the historical user interactions is limited to a recent threshold period of time.

19. The machine-readable hardware medium of claim 14, wherein the operations further comprise identifying a plurality of qualitative terms in the historical user interactions involving the product, determining a respective quantitative range for each of the qualitative terms, and reducing the quantitative ranges so that they do not numerically overlap.

* * * * *